(12) United States Patent
Kernbaum et al.

(10) Patent No.: US 10,670,119 B2
(45) Date of Patent: Jun. 2, 2020

(54) PURE ROLLING CYCLOIDS WITH VARIABLE EFFECTIVE DIAMETER ROLLERS

(71) Applicant: SRI INTERNATIONAL, Menlo Park, CA (US)

(72) Inventors: Alexander Steele Kernbaum, Sunnyvale, CA (US); Curt Salisbury, San Ramon, CA (US)

(73) Assignee: SRI International, Menlo Park, CA (US)

( * ) Notice: Subject to any disclaimer, the term of this patent is extended or adjusted under 35 U.S.C. 154(b) by 217 days.

(21) Appl. No.: 15/738,706

(22) PCT Filed: Jun. 24, 2016

(86) PCT No.: PCT/US2016/039350
§ 371 (c)(1),
(2) Date: Dec. 21, 2017

(87) PCT Pub. No.: WO2017/044171
PCT Pub. Date: Mar. 16, 2017

(65) Prior Publication Data
US 2019/0242464 A1    Aug. 8, 2019

Related U.S. Application Data

(60) Provisional application No. 62/185,502, filed on Jun. 26, 2015.

(51) Int. Cl.
*F16H 13/08* (2006.01)
*F16H 1/28* (2006.01)
*F16H 13/06* (2006.01)

(52) U.S. Cl.
CPC ............... *F16H 13/08* (2013.01); *F16H 1/28* (2013.01); *F16H 13/06* (2013.01)

(58) Field of Classification Search
CPC .................................. F16H 13/08; F16H 25/06
See application file for complete search history.

(56) References Cited

U.S. PATENT DOCUMENTS 4,554,846 A    11/1985  Distin, Jr. et al.
4,584,904 A     4/1986  Distin, Jr. et al.
(Continued)

FOREIGN PATENT DOCUMENTS

CN    103277464 A    9/2013
JP    60-241549 A   11/1985

OTHER PUBLICATIONS

The International Search Report (ISR) for PCT/US2016/039350 dated Mar. 28, 2017, pp. 1-3.
(Continued)

*Primary Examiner* — Derek D Knight
(74) *Attorney, Agent, or Firm* — McDonnell Boehnen Hulbert & Berghoff LLP

(57) ABSTRACT

An apparatus includes a first ring having an open annular space and a variable-width groove disposed on an interior peripheral surface of the first ring; a second ring rotatable within the open annular space of the first ring, where the second ring has a respective variable-width groove disposed on an exterior peripheral surface of the second ring; and a plurality of rollers disposed between, and configured to roll on, the interior peripheral surface of the first ring and the exterior peripheral surface of the second ring and rotatable therebetween.

18 Claims, 20 Drawing Sheets

(56) References Cited

U.S. PATENT DOCUMENTS

| | | | |
|---|---|---|---|
| 4,922,781 A | 5/1990 | Peiji | |
| 5,443,317 A | 8/1995 | Momono et al. | |
| 10,167,932 B2 * | 1/2019 | Yoshioka | F16H 15/50 |
| 2004/0244522 A1 | 12/2004 | Ballard | |

OTHER PUBLICATIONS

Written Opinion of the International Searching Authority for PCT/US2016/039350 dated Mar. 28, 2017, pp. 1-5.

* cited by examiner

PURE ROLLING CYCLOIDS WITH VARIABLE EFFECTIVE DIAMETER ROLLERS

CROSS REFERENCE TO RELATED APPLICATION

The present application claims priority to U.S. Provisional patent application No. 62/185,502, filed on Jun. 26, 2015, and entitled "Pure Rolling Cycloids," which is herein incorporated by reference as if fully set forth in this description.

GOVERNMENT RIGHTS

This invention was made in part with U.S. Government support under Contract No. W31P4Q-13-C-0046 awarded by the United States Army. The Government may have certain rights in this invention.

BACKGROUND

The term "transmission" may refer generally to systems that provide speed and torque conversions from a rotating power source to another device. Industrial machinery, medical robotics, and domestic electronics may utilize such transmissions. Selecting or designing a transmission involves considering multiple factors. Example factors include load capacity, efficiency, and cost.

SUMMARY

The present disclosure describes embodiments that relate to systems and apparatuses associated with pure rolling cycloids with variable effective diameter rollers.

In one aspect, the present disclosure describes an apparatus. The apparatus includes a first ring having an open annular space and a series of variable-width cutouts disposed on an interior peripheral surface of the first ring. The apparatus also includes a second ring rotatable within the open annular space of the first ring, where the second ring has a respective series of variable-width cutouts disposed on an exterior peripheral surface of the second ring. The apparatus further includes a plurality of rollers disposed between, and configured to roll on, the interior peripheral surface of the first ring and the exterior peripheral surface of the second ring and rotatable therebetween. The first ring has a total number of variable-width cutouts and the second ring has a total number of variable-width cutouts, with the total number of variable-width cutouts of the second ring being smaller than the total number of variable-width cutouts of the first ring, and a total number of the plurality of rollers being less than the total number of variable-width cutouts of the first ring and greater than the total number of variable-width cutouts of the second ring.

In another aspect, the present disclosure describes an apparatus. The apparatus includes a first ring having an open annular space and a plurality of depressions spatially arranged in series along an interior peripheral surface of the first ring, where a groove is disposed in the interior peripheral surface including the plurality of depressions. The apparatus also includes a second ring rotatable within the open annular space of the first ring, where the second ring has a respective plurality of depressions spatially arranged in series along an exterior peripheral surface of the second ring, and where a respective groove is disposed in the exterior peripheral surface including the respective plurality of depressions. The apparatus further includes a plurality of rollers configured to engage, and roll within, the groove disposed in the interior peripheral surface and the respective groove disposed in the exterior peripheral surface as the second ring rotates within the open annular space of the first ring.

In still another aspect, the present disclosure describes an apparatus. The apparatus includes a first ring having an open annular space and a variable-width groove disposed on an interior peripheral surface of the first ring. The apparatus also includes a second ring rotatable within the open annular space of the first ring, where the second ring has a respective variable-width groove disposed on an exterior peripheral surface of the second ring. The apparatus further includes a plurality of rollers disposed between, and configured to roll on, the interior peripheral surface of the first ring and the exterior peripheral surface of the second ring and rotatable therebetween while engaging the variable-width groove of the first ring and the respective variable width groove of the second ring.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1B:
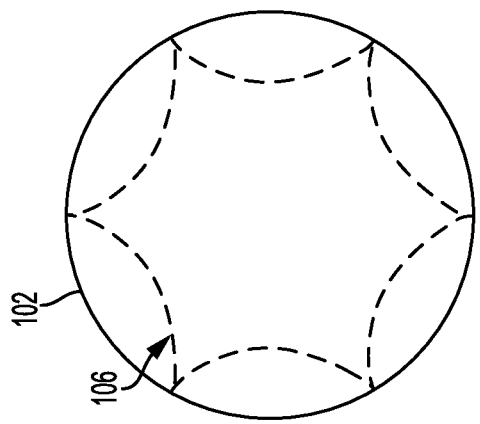
FIG. 1B illustrates a cycloid curve resulting from rolling a circle within a ring, in accordance with an example implementation.

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

I. Overview

Selecting or designing a transmission for a particular application involves considering multiple factors. Example factors include load capacity, efficiency, and cost. Transmission systems could be heavy if designed for a large load capacity. On the other hand, small transmission systems tend to have a small load capacity. Further, transmission systems tend to be expensive if high performance, defined by parameters such as efficiency, backlash, etc., is desired. Hence, a transmission system that can increase load capacity for a given size and also reduce the cost of manufacturing can be beneficial.

In some examples, transmissions are designed to meet some goals at the expense of others. For instance, ball or roller bearings could be used in transmissions systems to achieve high efficiency. However, these bearings experience stress concentrations due to the small sizes of their rollers. To alleviate stress concentrations, fixed sliding contacts could be used instead, but sliding contacts typically have lower efficiency.

Disclosed herein are transmissions involving cycloid drive apparatuses and systems that utilize pure rolling components that could be larger than roller bearings, thus providing large torque capacity for a given weight of the transmission. Further, the disclosed systems utilize configurations to harvest the output of the cycloid drives and compensate for inherent eccentricity of cycloid drives.

II. Cycloid Motion

As used herein, the term "cycloid" refers to the curve traced by a point on a rim of a circular wheel as the wheel rolls along either a straight or circular path without slippage. In an example, cycloid motion results when the circular wheel rolls inside a main circle or ring. FIG. 1A illustrates a circle 100 rolling within a ring 102, in accordance with an example implementation. A point 104 on a rim of the circle 100 traces a cycloid curve as the circle 100 moves along an internal surface of the ring 102.

Figure 1A:
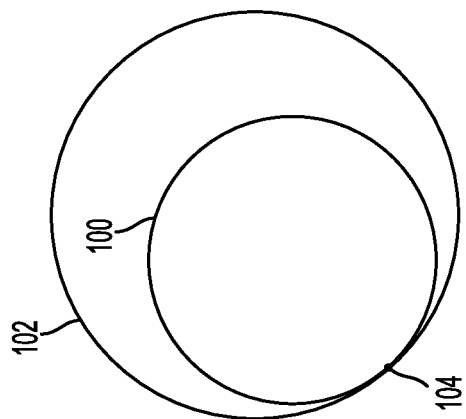
FIG. 1A illustrates a circle rolling within a ring, in accordance with an example implementation.

FIG. 1B illustrates a cycloid curve 106 resulting from rolling the circle 100 within the ring 102, in accordance with an example implementation. The cycloid curve 106 is traced by the point 104 as the circle 100 rolls within the ring 102. The motion of the circle 100, while the ring 102 remains stationary, could be referred to as cycloid motion.

Disclosed herein are example transmission systems and apparatuses that utilize this cycloid motion. These systems and apparatuses can provide an advantageous configuration that may achieve high efficiency and light weight or small form factor. These transmission systems could be used in robotic applications where motors and transmissions could be mounted at a distance from the main body of a robot. Automotive, heavy industry, and energy generation, among other applications, could also benefit from utilizing the transmissions described herein.

III. Example Cycloid Drive Apparatus

Figure 2A:
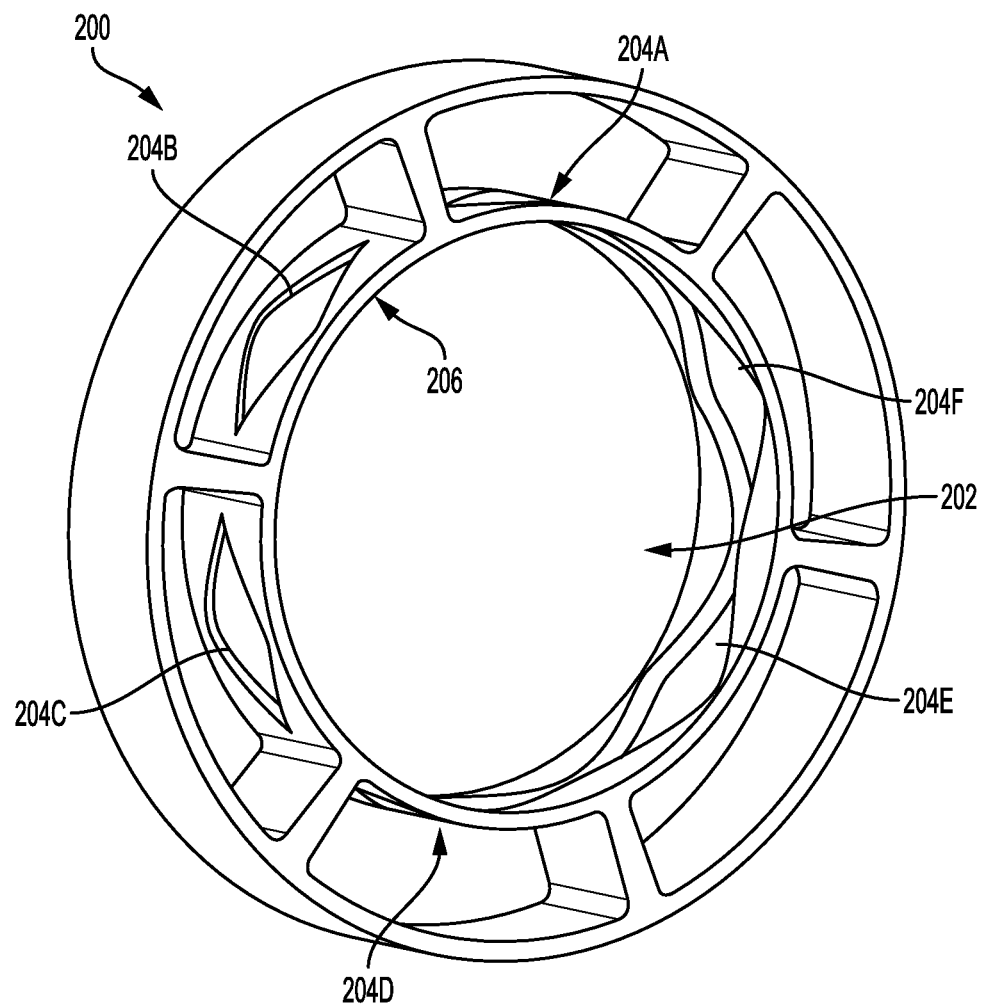
FIG. 2A illustrates a first ring, in accordance with an example implementation.

FIGS. 2A, 2B, 2C, 2D, 2E, and 2F illustrate an example cycloid drive apparatus, in accordance with an example implementation. Particularly, FIG. 2A illustrates a first ring 200, in accordance with an example implementation. The first ring 200 has an open annular space 202 and a series of variable-width cutouts 204A, 204B, 204C, 204D, 204E, and 204F disposed on an interior peripheral surface 206 of the first ring 200.

Figure 2B:
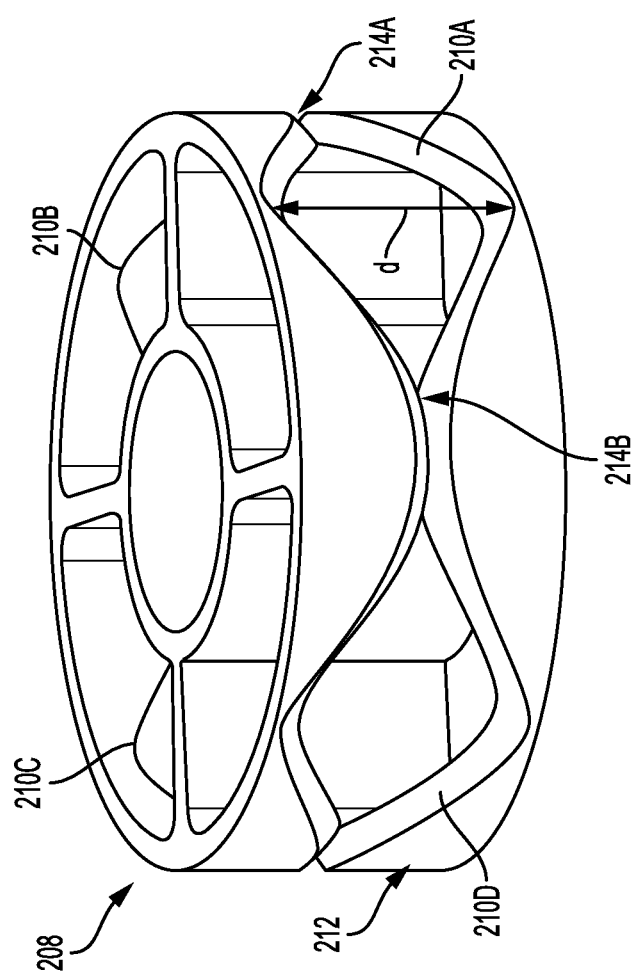
FIG. 2B illustrates a second ring rotatable within an open annular space of the first ring shown in FIG. 2A, in accordance with an example implementation.

FIG. 2B illustrates a second ring 208 that is rotatable within the open annular space 202 of the first ring 200, in accordance with an example implementation. The second ring 208 has a respective series of variable-width cutouts such as cutout 210A, 210B, 210C, and 210D disposed on an exterior peripheral surface 212 of the second ring 208.

Each cutout of the series of variable-width cutouts 204A-F of the first ring 200 and the series of variable-width cutouts 210A-D of the second ring 208 starts with a first width at a first end of the cutout. The width then increases to a second width larger than the first width at a center of the cutout, and then narrows back to the first width at a second end of the cutout. To illustrate, the cutout 210A of the second ring 208 has a first end 214A and a second end 214B. The width of the cutout 210A at the first end 214A is small. The width then increases gradually to a width "d" at a center of the cutout 210A, then decreases gradually until the second end 214B, where the width is similar to the width at the first end 214A.

FIGS. 2A and 2B illustrate separate cutouts 204A-F and 210A-D that are separated by blank areas of the interior peripheral surface 206 and the exterior peripheral surface 212, respectively. For instance, referring to the first ring 200 illustrated in FIG. 2A, the cutouts 204A-F are distinct and separate from each other and are separated by blank regions on the interior peripheral surface 206.

However, in other example implementations the surfaces 206 and 212 may each have a respective continuous variable-width channel or groove disposed therein. Each continuous variable-width channel or groove may be analogous to a raceway of a bearing. In this analogy, the rings 200 and 208 operate similar to races of the bearing. A width of the variable-width groove may vary gradually between a first width and a second width larger than the first width. For instance, the first width may be similar to the width at the first end 214A of the cutout 210A, and the second width may be similar to the width "d" at the center of the cutout 210A. The variable-width cutouts 204A-F and 210A-D may represent regions of the variable-width groove that increase from the first width to the second width and back to the first width. The variable-width cutouts 204A-F and 210A-D may then be separated by portions such as a portion of the variable-width groove having the first width or some other width (see e.g., FIG. 5A). In this manner, the variable-width cutouts 204A-F and 210A-D may be portions of respective variable-width continuous grooves or raceways.

Figure 2C:
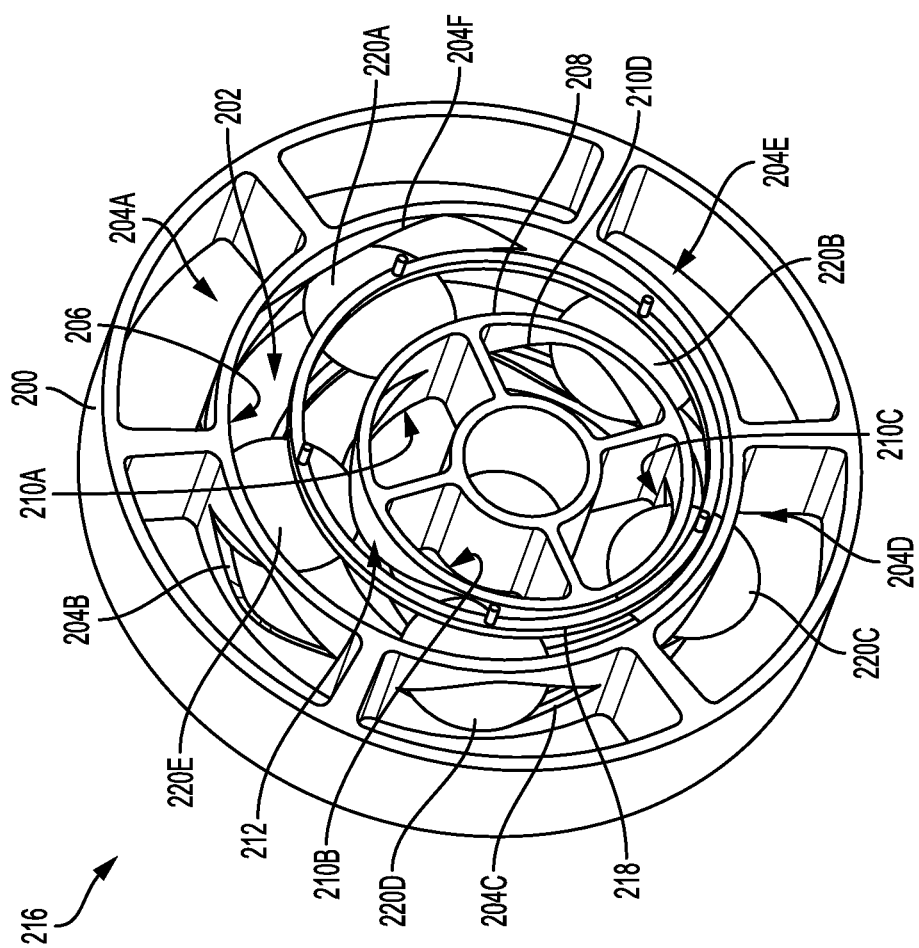
FIG. 2C illustrates a cycloid drive apparatus with the second ring of FIG. 2B rotatable within the first ring of FIG. 2A, in accordance with an example implementation.

FIG. 2C illustrates a cycloid drive apparatus 216 with the second ring 208 rotatable within the first ring 200, in accordance with an example implementation. The apparatus 216 includes a roller cage 218 that is disposed between the first ring 200 and the second ring 208 and configured to couple a plurality of rollers 220A, 220B, 220C, 220D, and 220E to each other. The roller cage 218 is rotatable in the open annular space 202 of the first ring 200 as the plurality of rollers 220A-E roll on and between the interior peripheral surface 206 of the first ring 200 and the exterior peripheral surface 212 of the second ring 208. The roller cage 218 couples the rollers 220A-E such that the rollers 220A-E are equidistant from each other.

As each roller of the rollers 220A-E roll on the interior peripheral surface 206 and the exterior peripheral surface 212 of the second ring 208, the roller traverses the cutouts 204A-F and 210A-D. As a roller of the rollers 220A-E traverse a cutout of the cutouts 204A-F and 210A-D, the roller moves from an area of the cutout that has a small width to an area that is wider (i.e., near a center region of the cutout). Thus, as the roller passes over the cutout, more or less of the roller engages in the cutout. Particularly, at the wider area of the cutout, the roller passes deeper through the surface that the cutout is disposed in, i.e., the interior peripheral surface 206 or the exterior peripheral surface 212. Thus, as the roller traverses through the cutout, a radial distance between a center of the first ring 200 and the roller varies.

To illustrate, as shown in FIG. 2C, the roller 220E is less engaged with the cutout 204B as the roller 220E is near one end of the cutout 204B. On the other hand, the roller 220D is more engaged with the cutout 204C, i.e., the roller 220D is disposed deeper in the cutout 204C as the roller 220D nears the center of the cutout 204C. The roller 220C is even more engaged with the cutout 204D than the roller 220D is engaged with the cutout 204C as the roller 220C is substantially at the center of the cutout 204D. The rollers 220A-E behave similarly and engage more or less with the cutouts 210A-D of the second ring 208 as the rollers 220A-E traverse the cutouts 210A-D. The variable width of the cutouts or grooves defining the cutout is the means by which the variable effective diameter of the rollers is generated as the rollers traverse the cutouts or grooves. These variable effective diameter rollers enable maintaining pure rolling motion in the apparatus 216.

As mentioned above, the cutouts 204A-F and 210A-D could be parts of a respective variable-width groove that operates analogously to the raceways of a bearing. Thus, in principle, each of the rollers 220A-E contacts each raceway at a single point. However, a load on an infinitely small point would cause infinitely high contact pressure. In practice, the roller deforms (flattens) slightly where it contacts each raceway, much as a tire flattens where it touches the road. The raceway also dents slightly where each roller presses on it. Thus, the contact between roller and raceway is of finite size and has finite pressure.

In an example, the apparatus 216 could operate as a cycloid speed reducer configured to reduce the speed of an input shaft by a certain ratio. For instance, the second ring 208 could be eccentrically mounted via a bearing to an input shaft (not shown). In this configuration, the input shaft drives the second ring 208 along a curved path within the open annular space 202 of the first ring 200. Further, in an example, the first ring 200 could be configured as a stator of the cycloid speed reducer (i.e., the first ring 200 could be fixed). Then, an output shaft could be coupled to the second ring 208, with the output shaft having a reduced speed compared to the input shaft. In another example, the first ring 200 could be coupled to an output shaft and rotatable, whereas the second ring 208 could be fixed and configured to operate as the stator of the cycloid speed reducer. Thus, the input, output, and stator designations are interchangeable.

For the apparatus 216 to operate as a cycloid speed reducer, the total number of variable-width cutouts 210A-D of the second ring 208 is less than the total number of variable-width cutouts 204A-F of the first ring 200. Further, a total number of the rollers 220A-E is less than the total number of variable-width cutouts 204A-F of the first ring 200 and greater than the total number of variable-width cutouts 210A-D of the second ring 208. In the apparatus 216 described above, the first ring 200 has six cutouts, the second ring 208 has four cutouts, and five rollers 220A-E are disposed between the first ring 200 and the second ring 208.

The reduction ratio of the cycloid speed reducer is determined based on the total number of rollers 220A-E. Particularly, the reduction ratio could be calculated using the following equation:

$$R = \frac{N_r - 1}{2} \quad (1)$$

where R is the reduction ratio and $N_r$ is the number of rollers.

One advantage of the apparatus 216 is that, based on equation (1), the apparatus 216 is capable of providing non-integer reduction ratios. As an example, if the first ring 200 has seven cutouts, the second ring 208 has five cutouts, and six rollers are disposed between the first ring 200 and the second ring 208 the ratio R can be calculated by equation (1) to be 2.5:1.

In examples, the total number of cutouts and rollers are three consecutive integers, e.g. 4 4 cutouts for the second ring 208, 5 rollers in the roller cage 218, and 6 cutouts in the first ring 200, as illustrated in FIGS. 2A-2C. However, cycloid drives with other patterns e.g. 4 cutouts for the second ring 208, 6 rollers in the roller cage 218, and 8 cutouts in the first ring 200, are also possible.

IV. Rolling Behavior

Figure 2D:
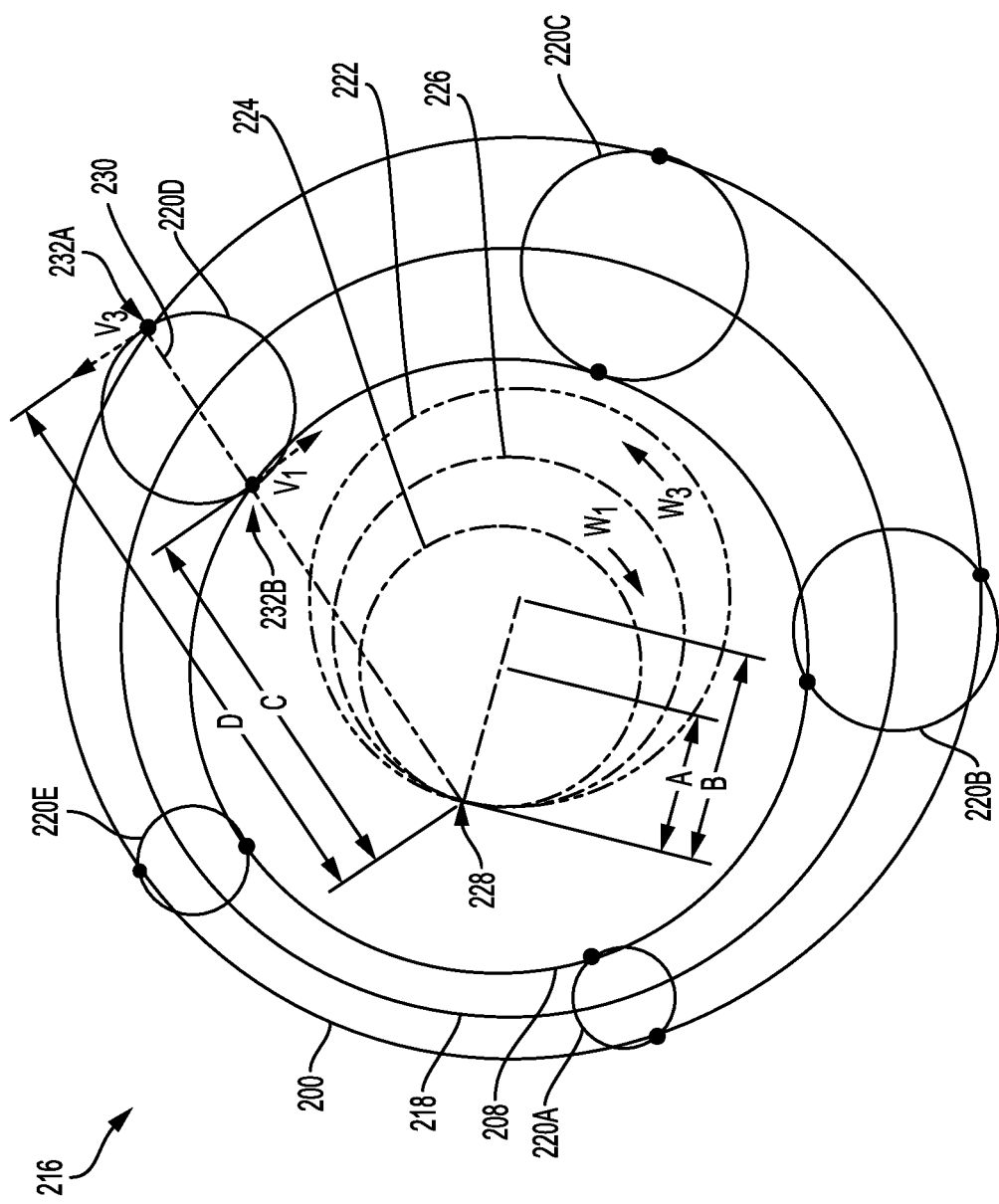
FIG. 2D illustrates a simplified diagram of the apparatus shown in FIG. 2C, in accordance with an example implementation.

Pure rolling occurs when both the magnitude and direction of the linear velocities of rigid bodies at their contact points match. FIG. 2D illustrates a simplified diagram of the apparatus 216, in accordance with an example implementation. The following analysis holds for any number of rollers or reduction ratio. FIG. 2D facilitates analysis of the apparatus 216 and relation between parameters that achieve pure rolling of the rollers 220A-E.

FIG. 2D illustrates the first ring 200, the second ring 208, and the roller cage 218 as circles or cylinders. The cylinders of the first ring 200 and the second ring 208 define the surfaces that the roller 220A-E make contact with. Thus, these cylinders will lie within the grooves or raceways of the first ring 200 and the second ring 208. Each of the first ring 200, the second ring 208, and the roller cage 218 has a corresponding pitch circle that is rigidly and concentrically respectively attached thereto. In FIG. 2D, pitch circle 222 corresponds to the first ring 200, pitch circle 224 corresponds to the second ring 208, and pitch circle 226 corresponds to the roller cage 218.

The surfaces that define the rings 200 and 208 are described here as cylinders, but they can also be conic sections, where each cross section is a circle. This implementation would be analogous to bevel gear type arrangements.

The three pitch circles 222, 224, and 226 could be defined by a desired reduction ratio to be achieved by the apparatus 216 and an amount of eccentricity between the input shaft and the second ring 208. Specifically, the ratio of the pitch circle diameters and the ratio of the diameters of the first ring 200, the second ring 208, and the roller cage 218 are equal to the ratio of the integer number of cutouts or rollers that each component has. For example, the ratio between the diameter of the pitch circle 222 and the diameter of the pitch circle 224 is equal to a ratio between the number of cutouts in the first ring 200 and the number of cutouts in the second ring 208. Similarly, the ratio between the diameters of the first ring 200 and the second ring 208 is also equal to the ratio between the number of cutouts in the first ring 200 and the number of cutouts in the second ring 208. As another example, the ratio between the diameter of the pitch circle 222 and the diameter of the pitch circle 226 is equal to the ratio between the number of cutouts in the first ring 200 and the number of rollers coupled to the roller cage 218. Similarly, the ratio between the diameters of the first ring 200 and the roller 218 is also equal to the ratio between the number of cutouts in the first ring 200 and the number of rollers coupled to the roller cage 218.

Figure 2E:
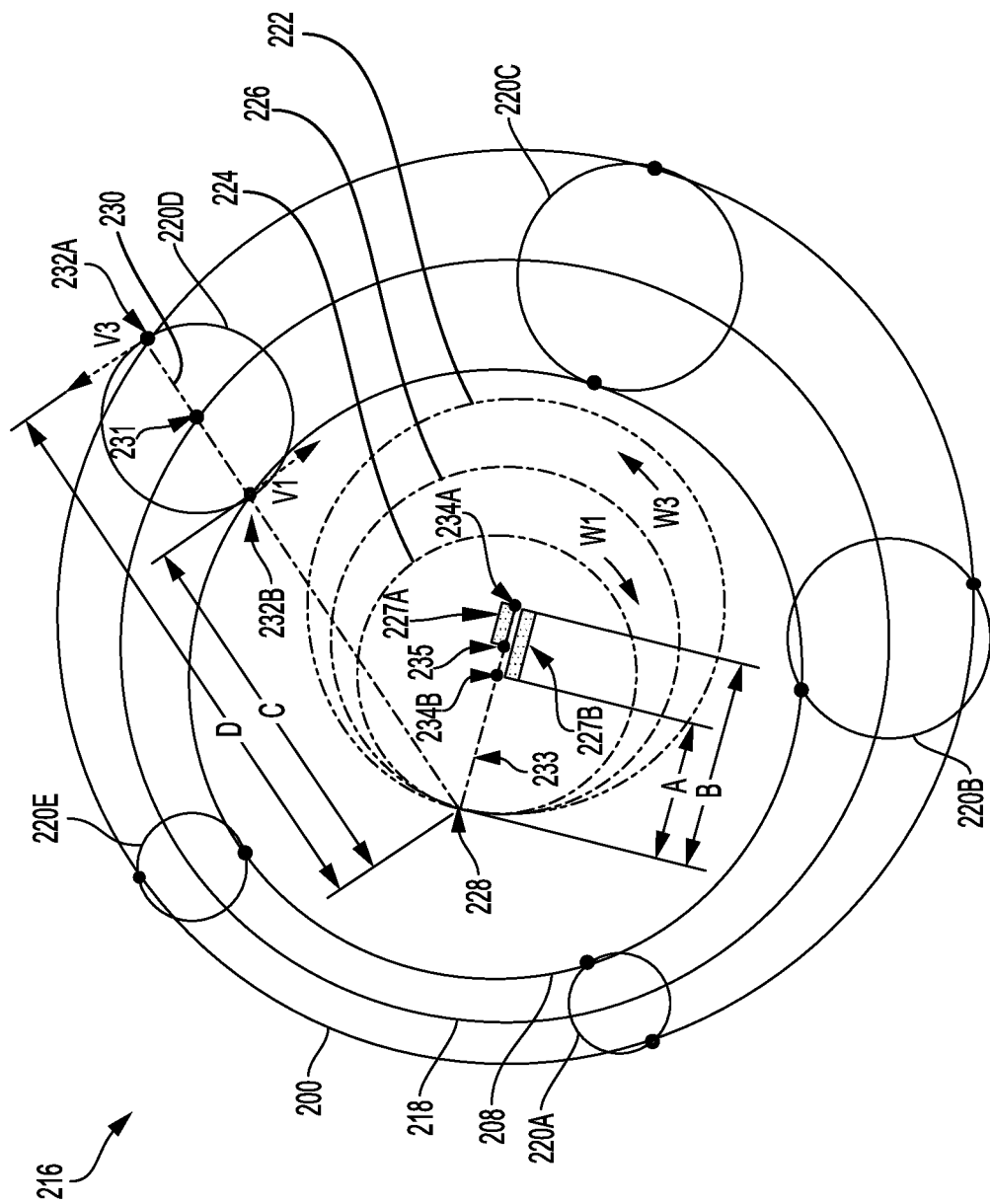
FIG. 2E illustrates relationship between pitch circles and eccentricity, in accordance with an example implementation.

Another constraint that facilitates defining the pitch circles 222, 224, 226 is the amount of eccentricity between the input shaft and the second ring 208. FIG. 2E illustrates relationship between the pitch circles 222, 224, and 226 and the amount of eccentricity, in accordance with an example implementation. Specifically, a difference 227A between the radius of the pitch circle 222 and the radius of the pitch circle 226 is half the amount of eccentricity. Further, a difference 227B between the radius of the pitch circle 222 and the radius of the pitch circle 224 is equal to the amount of eccentricity. As an example for illustration, the amount of eccentricity for the apparatus 216 with the above-mentioned number of cutouts and rollers could be 20 millimeter. In this example, the radius of the pitch circle 222 could be 60 mm, the radius of the pitch circle 226 could be 50 mm, and the radius of the pitch circle 224 could be 40 mm.

Pitch circles that are defined based on both the desired reduction ratio to be achieved by the apparatus 216 and the amount of eccentricity as discussed above, would intersect at a common instant center of rotation 228. The instant center of rotation 228, which could also be referred to as the instantaneous velocity center, is the point fixed to a body undergoing planar movement, with the point having zero velocity at a particular instant of time. At this instant, the velocity vectors of the trajectories of other points in the body generate a circular field around this point which is identical to what is generated by a pure rotation about the point.

As the first ring 200, the second ring 208, and the roller cage 218 share the instant center of rotation 228, contact points of a roller with the first ring 200 and the second ring 208 exist along a line that passes through the center of the roller, and also through the instant center of rotation 228. For example, that line for the roller 220D is represented by line 230 in FIG. 2E.

As a result of this configuration the direction of the velocities at the contact points between rigid bodies in the apparatus 216 (e.g., between the roller 220D, the first ring 200 and the second ring 208) match. In other words, the rigid bodies will not intersect or disconnect at the following moment. This can be referred to as the non-interference condition for pure rolling. However, at least one other condition is met for pure rolling to occur. Particularly, for pure rolling to occur, in addition to matching the direction of the velocities, absolute velocities (i.e., scalar magnitude of velocities) of the rigid body pairs at their contact points should also match. Each contact point is another constraint on the motion of the large set of rigid bodies connected at that point.

The absolute velocity of any point on a rigid body can be found by multiplying the angular velocity of the rigid body by the distance between the point and the instant center of rotation for the rigid body. Therefore, for the absolute velocities to match given a known set of angular velocities of the rigid bodies, these contact points should be located at specific distances from the instant center of rotation so as to preclude slipping.

For the apparatus 216, each of the rollers 220A-E contacts both the first ring 200 and the second ring 208 as it rolls therebetween. The resulting two contact points between a roller and the first and second rings 200 and 208 respectively should have the same angular velocity in order to preclude slipping.

Generally, the instant center of rotation for an object is dependent on its fixed frame of reference. Because all three pitch circles 222, 224, and 226 share a common instant center of rotation, any pitch circle can be chosen as the frame of reference. Choosing the pitch circle 226 that represents the roller cage 218 as a fixed frame of reference has an added advantage for the analysis presented herein. Treating the pitch circle 226 as a fixed frame of reference indicates that a respective center of each roller is now fixed, and its instant center of rotation is coincident with its geometric center. For instance, geometric center 231 of the roller 220D coincides with its instant center of rotation. However, the results would be the same for other configurations where for example the pitch circle 222 is fixed.

Thus, for the purposes of this analysis, it is convenient to fix the roller cage 218 and allow the first and second rings 200 and 208 to rotate. As shown in FIG. 2E, the two contact points 232A and 232B are at equal distances from the instant center of rotation, which is coincident with the geometric center 231, of the roller 220D. Therefore, referring to the roller 220D in FIG. 2E, the absolute velocities at two contact points 232A and 232B should be equal and opposite to preclude the roller 220D from slipping.

Centers of the three pitch circles 222, 224, and 226 are at a fixed distance away from each other. Thus, the distance between centers 234A and 234B of the pitch circles 222 and 224 is equal to the amount of eccentricity (i.e., 227B), and they are at equal distances from the center of the fixed frame of reference, i.e., center 235 the pitch circle 226. To preclude slipping, the absolute velocities of the centers 234B and 234A should therefore be equal. Because the centers 234A and 234B are the centers of the pitch circles 222 and 224, another equation can be written to describe their velocities:

$$B * w_3 = A * w_3 \quad (2)$$

where "B" is a radius of the pitch circle 222 and "A" is a radius of the pitch circle 224, "$w_1$" is the angular velocity of the pitch circle 222 and the first ring 200, and "$w_3$" is the angular velocity of the pitch circle 224 and the second ring 208. The angular velocities "$w_1$" and "$w_3$" can be determined from the desired reduction ratio, but as shown in the analysis below, these angular velocities drop out of this analysis and might not be determined to show pure rolling.

As illustrated in FIG. 2E, "B" and "A" are collinear, i.e., a line 233 extending from the instant center of rotation 228 and intersecting with the centers 234A and 234B of the pitch circles 222 and 224, respectively, exists. Based on equation (2):

$$\Rightarrow \frac{B}{A} = \frac{w_1}{w_3} \quad (3)$$

Figure 2F:
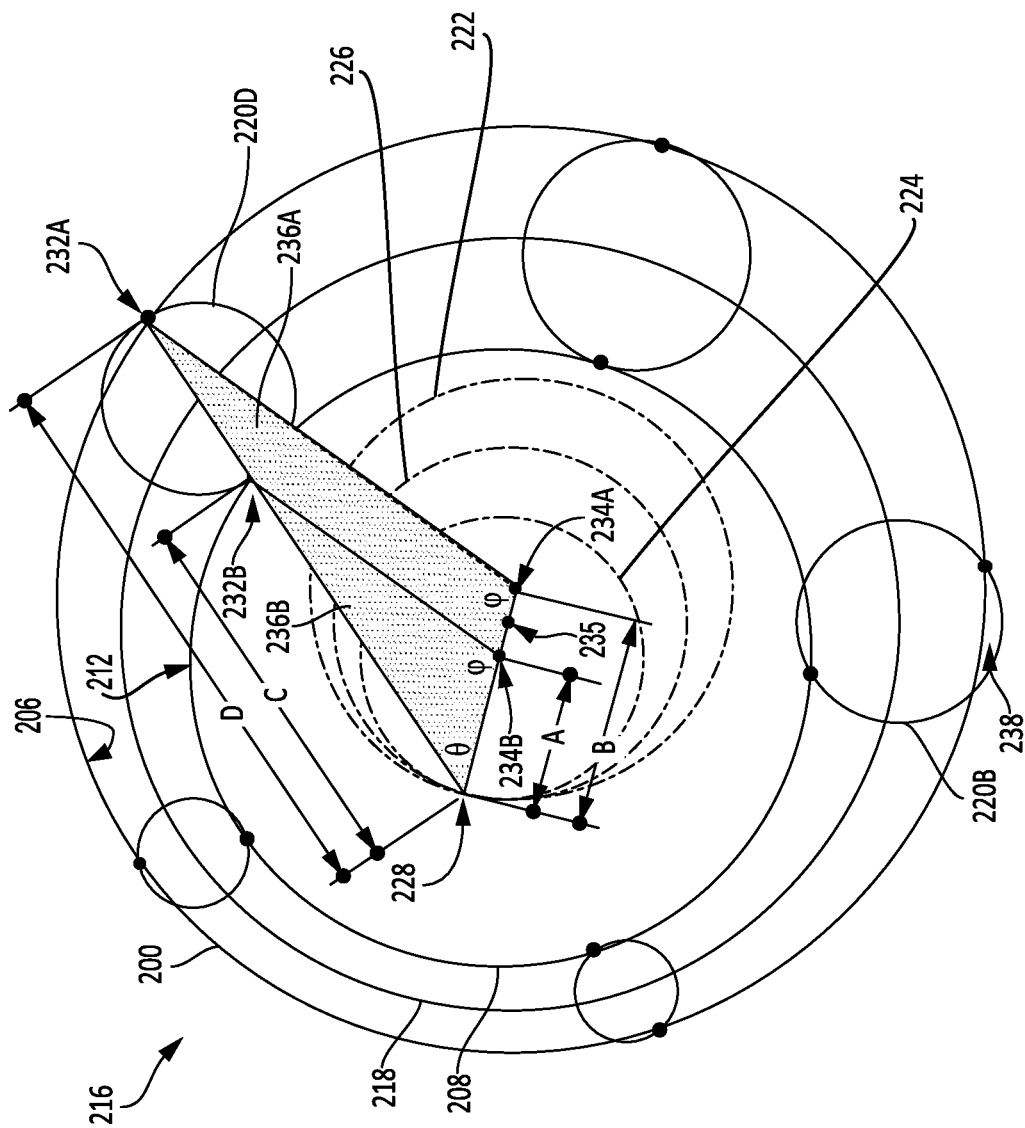
FIG. 2F illustrates similarity of triangles connecting instant center of rotation with centers of pitch circles and contact points, in accordance with an example implementation.

FIG. 2F illustrates similarity of triangles 236A and 236B connecting the instant center of rotation 228 with the centers 234A and 234B of the pitch circles 222 and 224 and the contact points 232A and 232B, in accordance with an example implementation. The triangles 236A and 236B share the angles θ and φ as shown in FIG. 2F. Based on the illustrated similarity of the triangles 236A and 236B:

$$\Rightarrow \frac{D}{C} = \frac{B}{A} \quad (4)$$

where "D" is a distance between the contact point 232A and the instant center of rotation 228 and "C" is a distance between the contact point 232B and the instant center of rotation 228. Thus:

$$\Rightarrow \frac{D}{C} = \frac{w_1}{w_3} \quad (5)$$

or:

$$D * w_3 = C * w_1 \quad (6)$$

Referring back to FIG. 2D:

$$D * w_3 = V_1 \text{ and } C * w_1 = V_3 \quad (7)$$

where "$V_3$" and "$V_1$" are linear scalar velocities at the contact points 232A and 232B, respectively. Based on equations (6) and (7):

$$V_1 = V_3 \quad (8)$$

According to equation (8) the velocities "$V_3$" and "$V_1$" at the contact points 232A and 232B, respectively, are equal in magnitude, and therefore are consistent with the constraints provided by the roller 20D, and thus no slipping would occur.

FIGS. 2D and 2E represent a snapshot of a dynamic geometric configuration, where the instant center of rotation 228 completes an orbit for each rotation of the input shaft coupled to the cycloid speed reducer. The effective diameters of the rollers 220A-E are constantly changing through an orbit. Nonetheless, the above analysis relies on invariant parameters, and thus holds for all configurations through a cycle, and therefore all roller contact points.

Thus, the rollers 220A-E of the apparatus 216 should roll without slipping if the apparatus 216 has the dimensional relationships described above, e.g., by equations (2)-(8), and illustrated in FIGS. 2D, 2E, and 2F.

Referring to FIGS. 2D-2F, there appears to be interference between the rollers 220A-E and the first ring 200 and the second ring 208. For instance, a region 238 shown in FIG. 2F appears to be an interference between the roller 220B and the first ring 200. However, the region 238 is not an interference. The region 238 illustrates that the roller 220B sits deeper in a respective groove or cutout (e.g., a cutout of the cutouts 204A-F) in the first ring 200. In other words, the roller 220B happens to be at a point in the groove or cutout that is sufficiently wide, causing the roller 220B to sink deeper in the first ring 200.

V. Example Alternative Configurations for the Cycloid Drive Apparatus

Figure 3A:
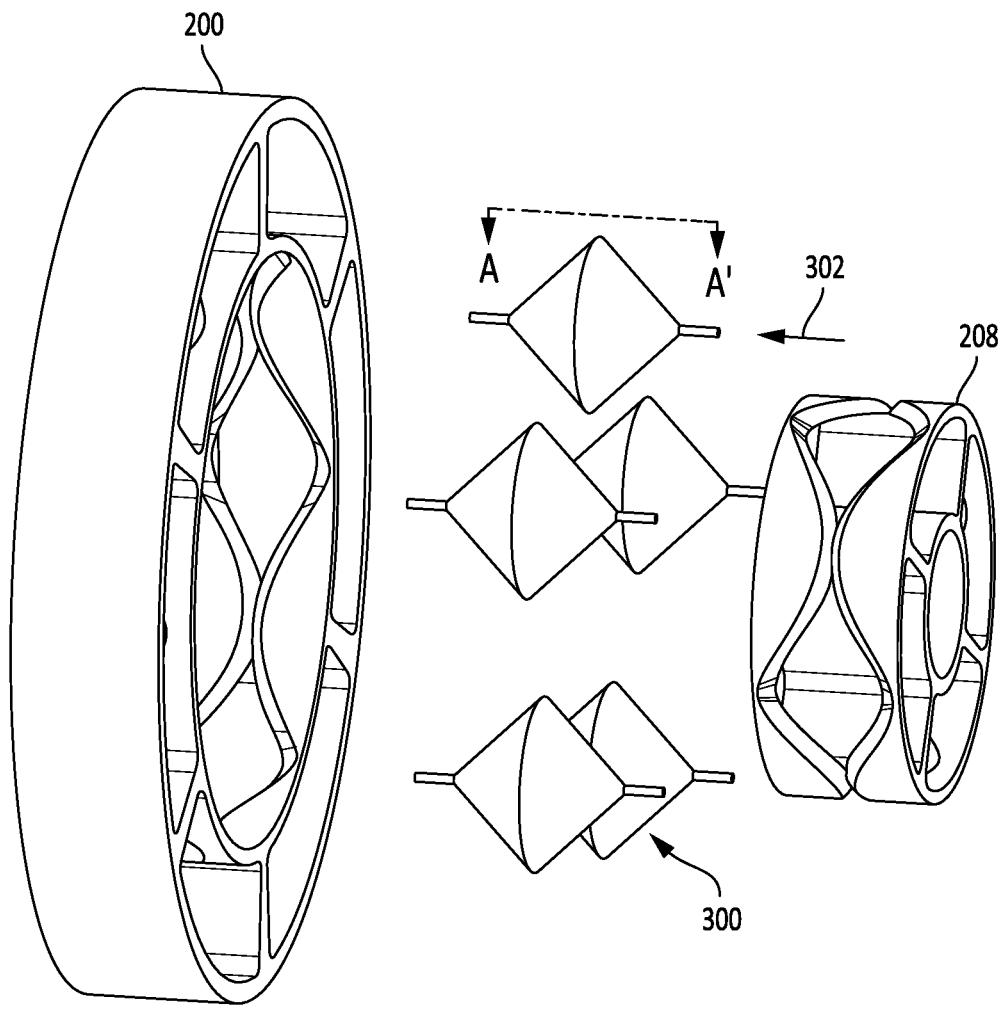
FIG. 3A illustrates a partial exploded view of the apparatus of FIG. 2C having non-spherical rollers, in accordance with an example implementation.
Figure 3B:
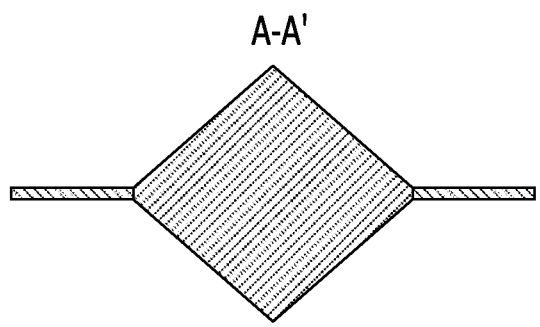
FIG. 3B illustrates a cross section of a roller of the rollers shown in FIG. 3A, in accordance with an example implementation.

Several example alternative configurations for the apparatus 216 described in FIGS. 2A-2F are now described. In the configuration described above, the rollers 220A-E are shown to be spherical. FIGS. 3A-3B illustrate use of non-spherical rollers, in accordance with an example implementation.

Particularly, FIG. 3A illustrates a partial exploded view of the apparatus 216 showing non-spherical rollers 300, in accordance with an example implementation. The rollers 300 replace the rollers 220A-E and are configured to roll between the first ring 200 and the second ring 208.

FIG. 3B illustrates a cross section of a roller of the rollers 300, in accordance with an example implementation. As shown, the cross section A-A' is rhombic in a plane parallel to an axis of rotation of the second ring 208, i.e., in a plane parallel to an arrow 302. The cross section in a plane perpendicular to the axis of rotation of the second ring 208, i.e., perpendicular to the arrow 302, is a circular cross section similar to cross sections of the rollers 220A-E. The grooves or cutouts of the first ring 200 and the second ring 208 could also be changed to match a shape of the rollers 300. Other shapes of the rollers and grooves are also possible. However, one constraint on the shape of a roller is that the roller should be symmetric about its axis of rotation.

Figure 4A:
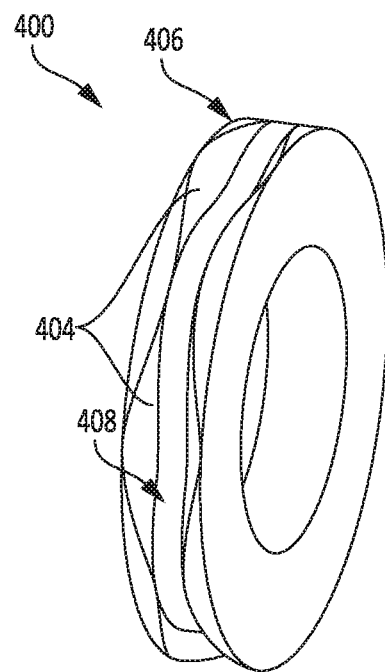
FIG. 4A illustrates an alternative second ring, in accordance with an example implementation.
Figure 4B:
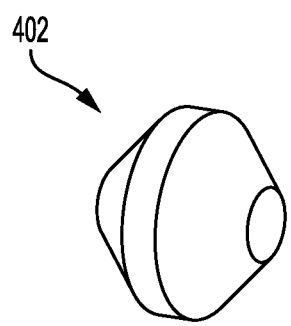
FIG. 4B illustrates a roller corresponding to the second ring of FIG. 4A, in accordance with an example implementation.

FIG. 4A illustrates an alternative second ring 400, and FIG. 4B illustrates a corresponding roller 402, in accordance with an example implementation. Instead of having variable-width cutouts like the second ring 208, the second ring 400 has a plurality of depressions such as depressions 404 spatially arranged in series along an exterior peripheral surface 406 of the second ring 400. A groove or channel 408 is disposed along the exterior peripheral surface 406. The channel 408 dips along with the depressions 404 as shown in FIG. 4A. A corresponding first ring (not shown) would have similar depressions and channel to match the second ring 400 and the roller 402.

Figure 5A:
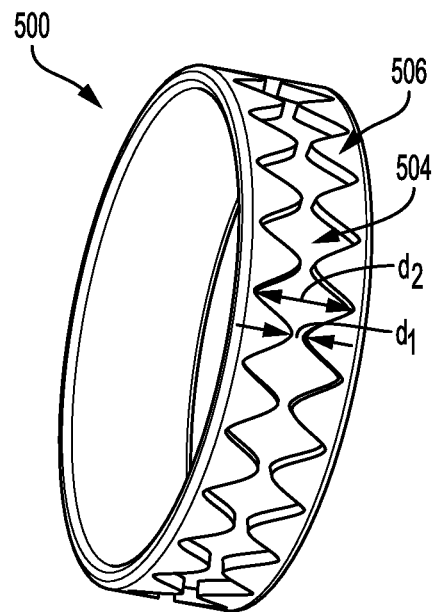
FIG. 5A illustrates an alternative second ring, in accordance with an example implementation
Figure 5B:
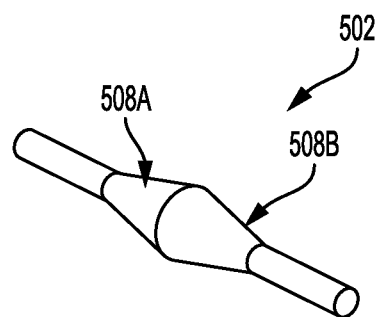
FIG. 5B illustrates a roller corresponding to the second ring of FIG. 5A, in accordance with an example implementation.

FIG. 5A illustrates an alternative second ring 500, and FIG. 5B illustrates a corresponding roller 502, in accordance with an example implementation. The second ring 500 has a variable-width groove 504 disposed on an exterior peripheral surface 506 of the second ring 500. Width of the variable-width groove 504 varies in a spatially periodic manner between a first width "$d_1$" and a second width "$d_2$" larger than the first width "$d_1$". A corresponding first ring (not shown) would have a similar groove to match the second ring 500 and the roller 502.

The roller 502 has a shape that matches a profile of the variable-width groove 504. Similar to the rollers 300, the roller 502 may have a rhombic cross section in a plane parallel to an axis of rotation of the second ring 500. However, the roller 502 has longer conical portions 508A-508B compared to the rollers 300. The longer conical portions 508A-508B may impart more consistent stiffness across the roller 502 as it rolls along the variable-width groove 504.

Figure 6A:
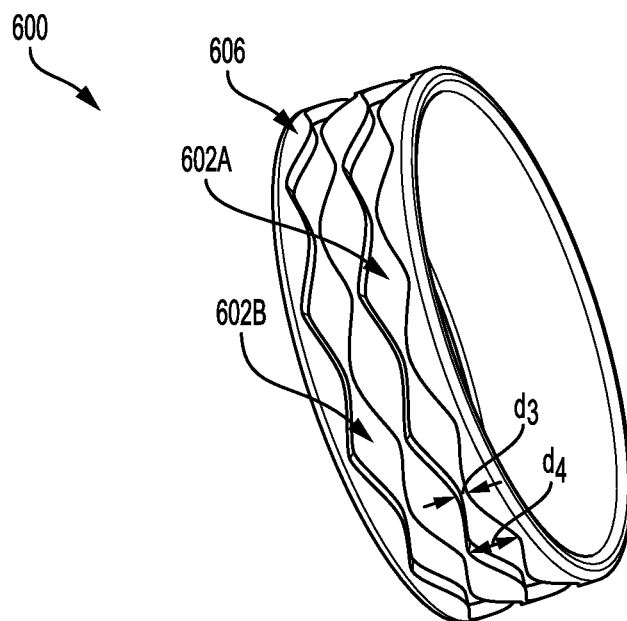
FIG. 6A illustrates an alternative second ring having two side-by-side grooves, in accordance with an example implementation.
Figure 6B:
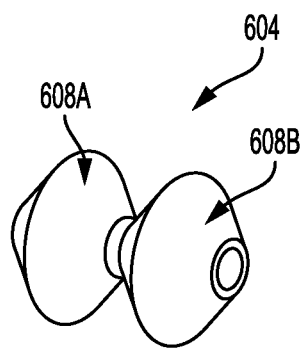
FIG. 6B illustrates a roller corresponding to the second ring of FIG. 6A, in accordance with an example implementation.

FIG. 6A illustrates an alternative second ring 600 having two side-by-side grooves 602A and 602B, and FIG. 6B illustrates a corresponding roller 604, in accordance with an example implementation. The grooves 602A and 602B are disposed on an exterior peripheral surface 606 of the second ring 600. Like the groove 504, respective widths of the grooves 602A and 602B vary in a spatially periodic manner between a first width "$d_3$" and a second width "$d_4$" larger than the first width "$d_3$". A corresponding first ring (not shown) would have similar parallel grooves to match the grooves 602A and 602B of the second ring 600 and the roller 602.

The roller 604 has a shape that matches respective profiles of the grooves 602A and 602B. Particularly, the roller 604 may be composed of two rollers 608A and 608B disposed side-by-side. In examples, the rollers 608A and 608B may be coupled to each other; however, in other examples, they might not be coupled to each other.

In examples, more than two grooves and more than two rollers could be stacked side-by-side. This construction of the roller 604 increases load capacity of the cycloid drive because the load is distributed among a greater number of contact points.

Further, using the side-by side rollers 608A-608B facilitates reducing their diameters for a given load capacity. As a result of using smaller roller diameters, the eccentricity of the input shaft relative to the second ring 600 can be decreased. Although the eccentricity can be removed at the output stage (see FIGS. 11-14), smaller eccentricity may be easier to reduce or remove, and the cycloid drive might be subjected to less vibration.

The implementations described in FIGS. 2A-6B are examples for illustration and other example implementations are contemplated. For example, it is contemplated that an apparatus may have the second ring 208 without the first ring 200. In this example, the second ring 208 may have a variable-width groove and the rollers 220A-E may traverse the variable-width groove, thus changing an effective diameter of the rollers 220A-E. In other examples, the rings 200 and 208 might not be circular in shape, but may have other non-circular shapes. For instance, the surfaces that define the rings 200 and 208 could be conic sections. This implementation would be analogous to bevel gear type arrangements. In another example, the variable-width grooves may trace a helical path instead of a circular path about a peripheral surface of a ring. In this example, the rollers would follow the helical path instead of a circular path shown in the Figures discussed above. Other implementations are possible as well.

VI. Example Roller-Groove Configurations

The configurations described above with respect to FIGS. 2A-2C, 3A-3B, 4A-4B, 5A-5B, and 6A-6B illustrate various example implementations of a cycloid drive with variable effective diameter rollers. Various other types of grooves, cutout, or channels could be used along with corresponding roller configuration and shapes. Further, other roller cross sections that maintain axial symmetry of the roller could be used.

The roller configuration, shape, and profile and the corresponding configuration of the grooves impact load capacity, load sharing, stiffness, efficiency and friction, contact stresses, torque output of the cycloid drive, and kinematic constraints of the cycloid drive. Thus, the configuration of the roller may be considered as a design parameter that may be adjusted to balance various requirements, such as load capacity and efficiency of the cycloid drive.

FIGS. 7A-7D illustrate example roller-groove configurations. The term "groove" is used in this section with respect to FIGS. 7A-7D to encompass the terms "cutouts," "channels," and "raceways" in addition to grooves. As mentioned above, the grooves are analogous to raceways of bearings, and the rings are analogous to races of bearings.

FIGS. 7A-7D illustrate cross section views of a roller 700 resting between an outer groove 702 of an outer or first ring 704 and an inner groove 706 of an inner or second ring 708. FIGS. 7A-7D illustrate four different roller-groove example designs. Although the roller 700 is shown as a spherical roller, other roller shapes could be used. The roller 700 may represent any of the rollers discussed above. Also, the first ring 704 may represent any of the first rings described above and the second ring 708 may represent any of the second rings discussed above.

The roller 700 interfaces with the grooves 702 and 706 at four locations 710A, 710B, 710C, and 710D. This interface can be optimized for a number of qualities such as efficiency, load capacity, wear, etc.

Figure 7A:
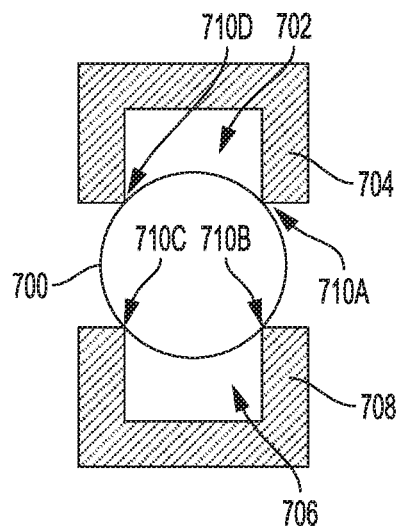
FIG. 7A illustrates a knife-edge roller-groove configuration, in accordance with an example implementation.

FIG. 7A illustrates a knife-edge roller-groove configuration, in accordance with an example implementation. The knife-edge configuration shown in FIG. 7A is characterized by the interface locations 710A-710D being substantially single-point contact or contact patches that spread to a short line contact under high loads. This style could provide high efficiency at all loads, but may be associated with increased wear.

Figure 7B:
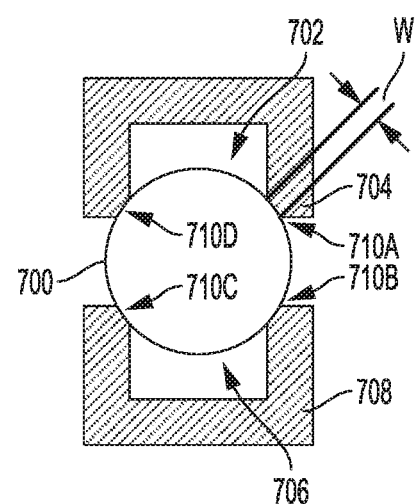
FIG. 7B illustrates a snug-fit roller-groove configuration, in accordance with an example implementation.

FIG. 7B illustrates a pocket or snug-fit roller-groove configuration, in accordance with an example implementation. In this snug-fit configuration, each of the locations 710A-710D has a longer line contact patch with length "w." This configuration can have high load capacity. At high loads, the line contact patches at the interface locations 710A-710D gets slightly thicker, thus increasing load capacity. However, this interface configuration causes lower efficiency due to slight scrubbing between the roller 700 and the rings 704 and 708.

Figure 7C:
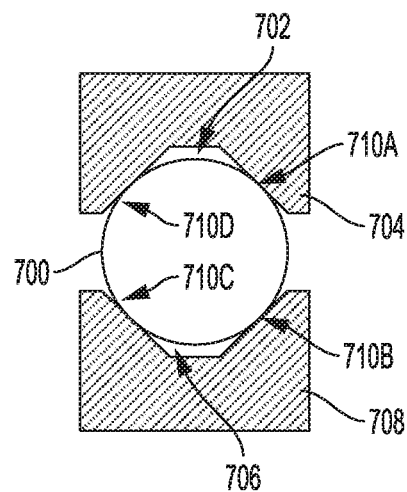
FIG. 7C illustrates a chamfer roller-groove configuration, in accordance with an example implementation.

FIG. 7C illustrates a chamfer roller-groove configuration, in accordance with an example implementation. This interface starts out as a point contact under low pressure and grows to an ellipsoidal shape under load. This interface may be easier to manufacture for some roller shapes due to simplified geometry.

Figure 7D:
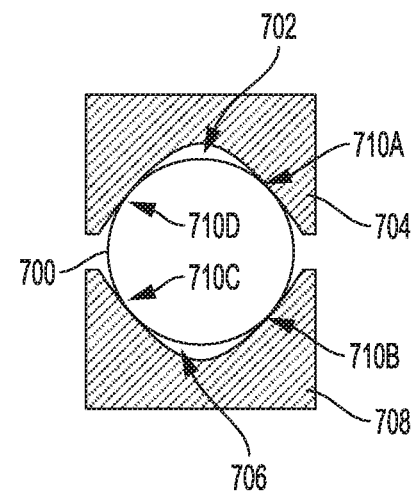
FIG. 7D illustrates a gothic-arch roller-groove configuration, in accordance with an example implementation.

FIG. 7D illustrates a gothic-arch roller-groove configuration, in accordance with an example implementation. In the configuration shown in FIG. 7D, the grooves 702 and 706 may have a curvature that is less than that of the roller 700 such that the contact patches at the locations 710A-710D grows quicker under load while maintaining high efficiency.

In examples, the configurations shown in FIG. 7A-7D could be used individually and consistently within a cycloid drive; however, these configurations may be combined within the cycloid drive for optimal effect along the length of a groove (i.e., the groove 702 and/or the groove 706). For instance, the widest part of the groove may have a chamfer interface configuration shown in FIG. 7C, while the highest load capacity part of the groove could have the snug-fit configuration shown in FIG. 7B. In examples, relief could be added to sections of the groove so as to temporarily loosen contact with the roller 700. This could be done to allow for re-alignment of parts, or reduction in wear.

VII. Example Parallel and Differential Cycloid Drive Configurations

Figure 8:
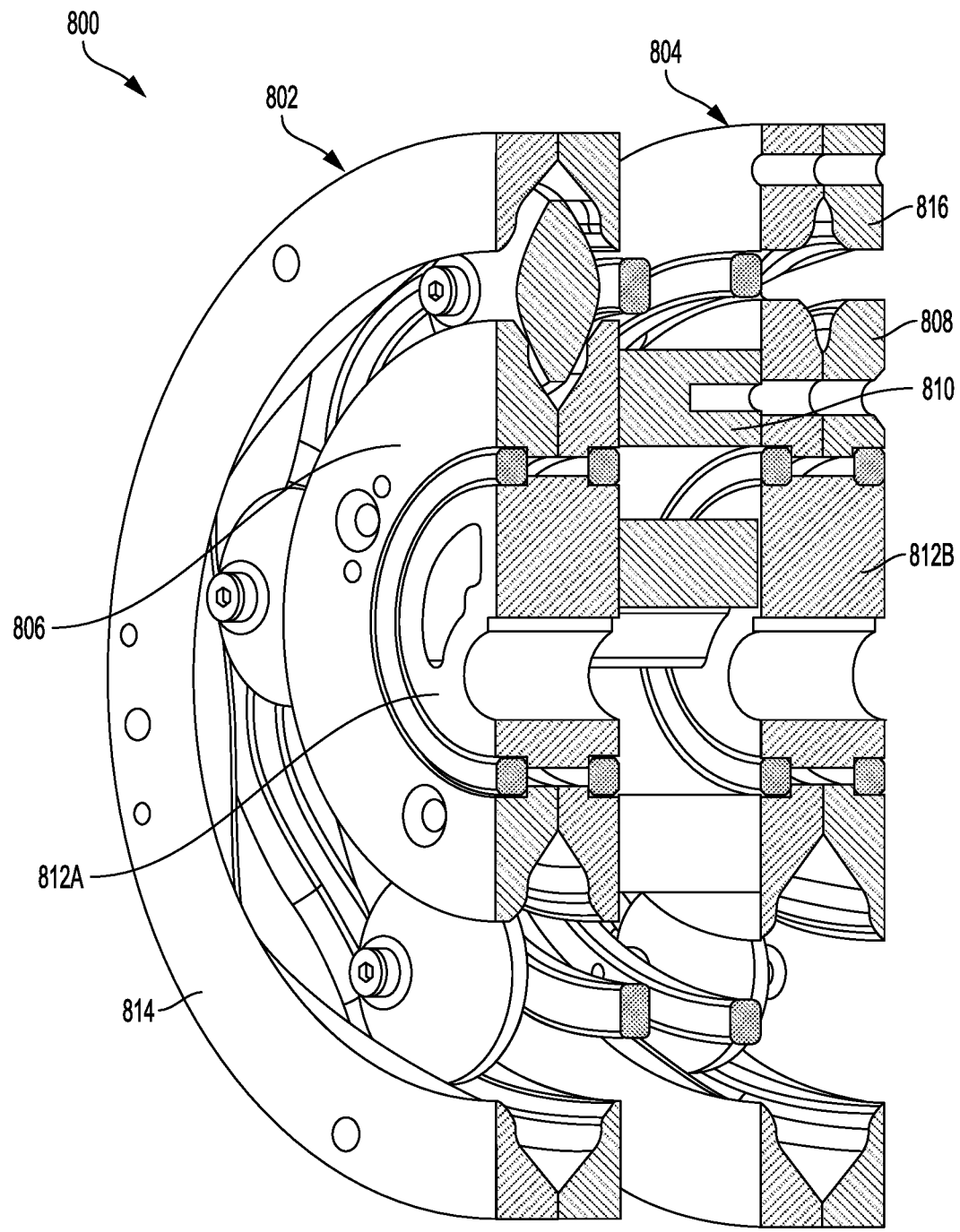
FIG. 8 illustrates a perspective cross section of a differential cycloid drive, in accordance with an example implementation.

FIG. 8 illustrates a perspective cross section of a differential cycloid drive 800, in accordance with an example implementation. The differential cycloid drive 800 includes two cycloid drives 802 and 804 connected differentially as shown in FIG. 8. The cycloid drives 802 and 804 could have any of the configurations discussed above and have different reduction ratios relative to each other.

A second ring 806 of the first cycloid drive 802 is coupled or connected to a second ring 808 of the second cycloid drive 804 via a coupling member 810. An input shaft (not shown) is configured to be eccentrically coupled to bearings or drive members 812A and 812B. The input shaft and the drive member 812A drive the second ring 806 within a fixed or stationary first ring 814 of the first cycloid drive 802. In other words, the first ring 814 is considered mechanical ground for the differential cycloid drive 800. In contrast, a first ring 816 of the second cycloid drive 804 is free to rotate.

This configuration allows for large reduction ratios. Specifically, assuming the first cycloid drive 802 has a reduction ratio "$R_1$," and the second cycloid drive 804 has a reduction ratio "$R_2$," the resulting reduction ratio $R_d$ of the differential cycloid drive 800 can be determined by the following equation:

$$R_d = \frac{R_1 - R_2}{1 + R_2} \qquad (9)$$

For instance, if "$R_1$" is 2:1 (i.e., $R_1=\frac{1}{2}$) and "$R_2$" is 2.5:1

$$\left(\text{i.e., } R_2 = \frac{1}{2.5}\right),$$

then $R_d$ can be calculated by equation (9) to be $\frac{1}{14}$. As such, large reduction ratios are achievable with the differential cycloid drive 800.

Another advantage of the differential cycloid drive 800 is that the eccentricity of the first cycloid drive 802 is cancelled or compensated for by the respective eccentricity of the second cycloid drive 804. In this manner, no additional mechanism are coupled to the differential cycloid drive 800 to rectify the output (i.e., compensate for the eccentricity) at the first ring 816.

Figure 9A:
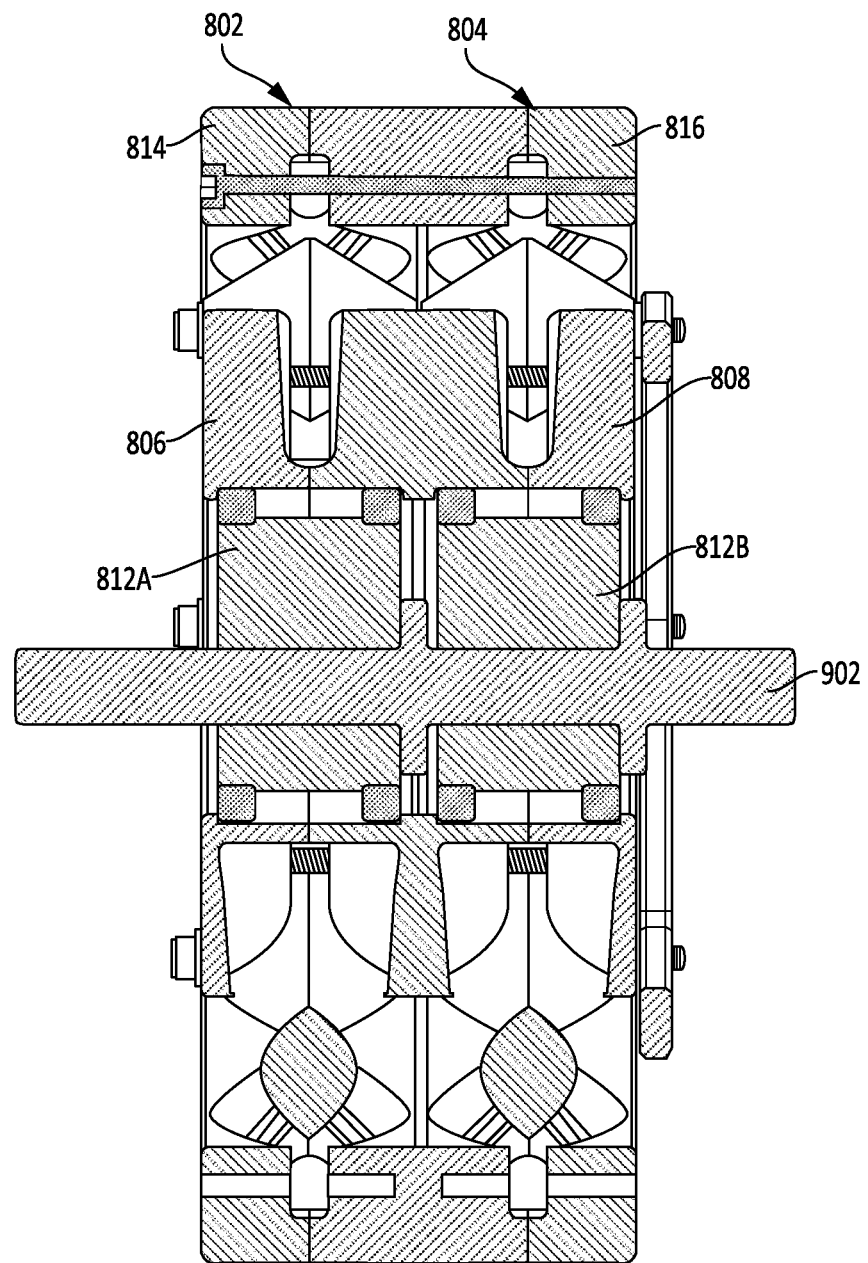
FIG. 9A illustrates two cycloid drives connected in parallel, in accordance with an example implementation.

Differential cycloids such as the differential cycloid drive 800 include the two cycloid drives 802 and 804 connected differentially. The cycloid drives 802 and 804 could also be connected in parallel or stacked together. FIG. 9A illustrates the two cycloid drives 802 and 804 connected in parallel, in accordance with an example implementation. The configuration shown in FIG. 9A is similar to the configuration shown in FIGS. 6A-6B. The drive members 812A and 812B are eccentrically mounted to an input shaft 902 and are configured to drive their respective second rings 806 and 808.

Using multiple pure rolling cycloids like the cycloid drives 802 and 804 stacked on top of each other in the same orientation, i.e., stacked in parallel, allows for greater load capacity as the load is distributed among multiple cycloid drives without significantly increasing part count. In an example, to facilitate manufacturing of this configuration, matched components from each cycloid could be manufactured as a single part. For instance, a single external ring could be manufactured to replace the two first rings 814 and 816. Similarly, a single internal ring, such as the ring 600 illustrated in FIG. 6A, could be manufactured to replace the two second rings 806 and 808.

Figure 9B:
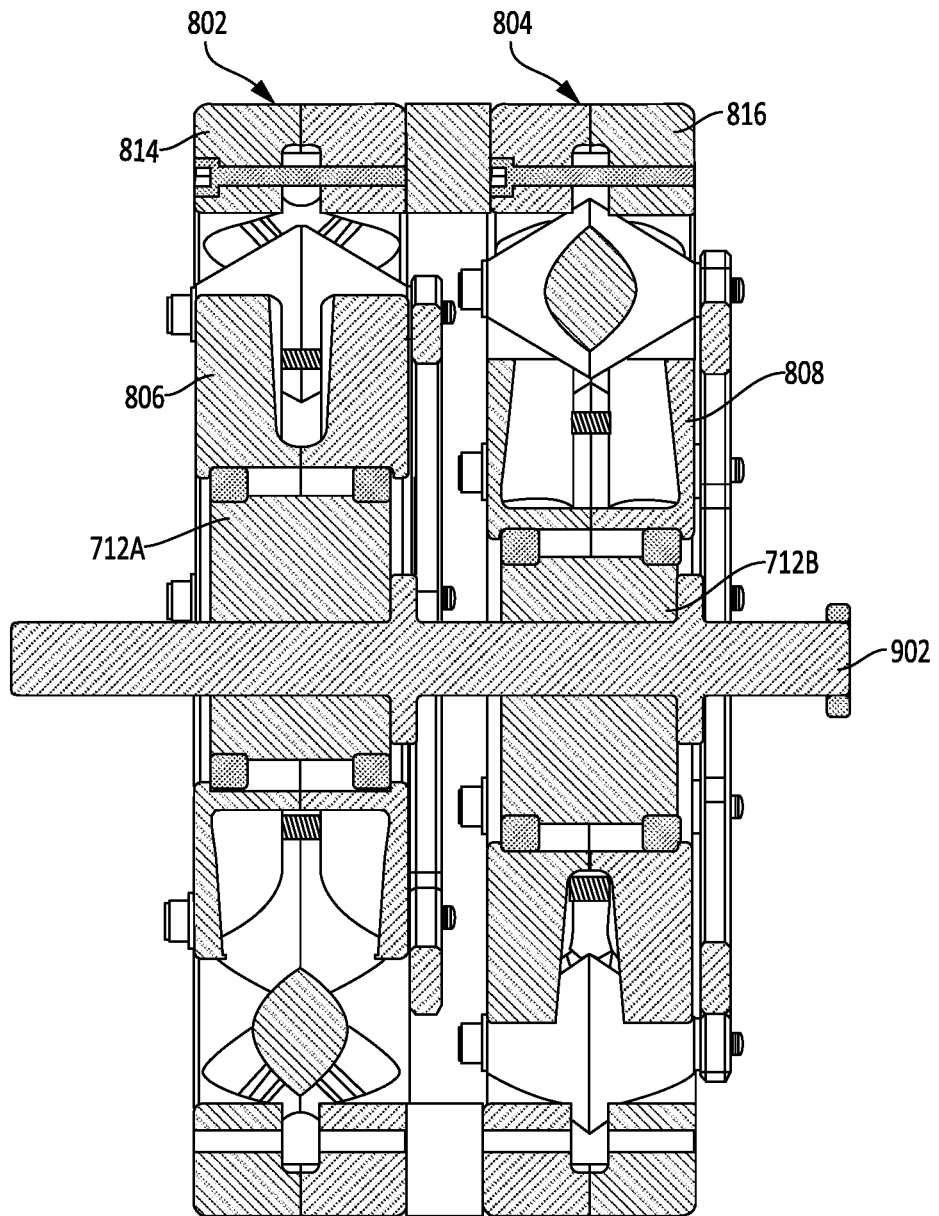
FIG. 9B illustrates two cycloid drives connected in parallel and offset relative to each other, in accordance with an example implementation.

In examples, multiple pure rolling cycloids could be stacked on top of each other while being offset relative to each other. FIG. 9B illustrates the two cycloid drives 802 and 804 connected in parallel with the cycloid drive 802 being offset relative to the cycloid drive 804, in accordance with an example implementation. As shown in FIG. 9B, the drive member 812A and the second ring 806 of the cycloid drive 802 are shifted upward relative to the drive member 812B and the second ring 808 of the cycloid drive 804. This configuration allows for greater load capacity and more even load transfer. However, the outputs connected to the second rings 806 and 808 might not be joined into a single output, and might be harvested independently.

VIII. Example Implementation with Backlash Reduction

It is desirable to reduce or eliminate backlash in mechanical systems. One source of backlash in the apparatuses and systems described above is the manufacturing tolerance between the rollers and the channels, grooves, or cutouts.

Figure 10:
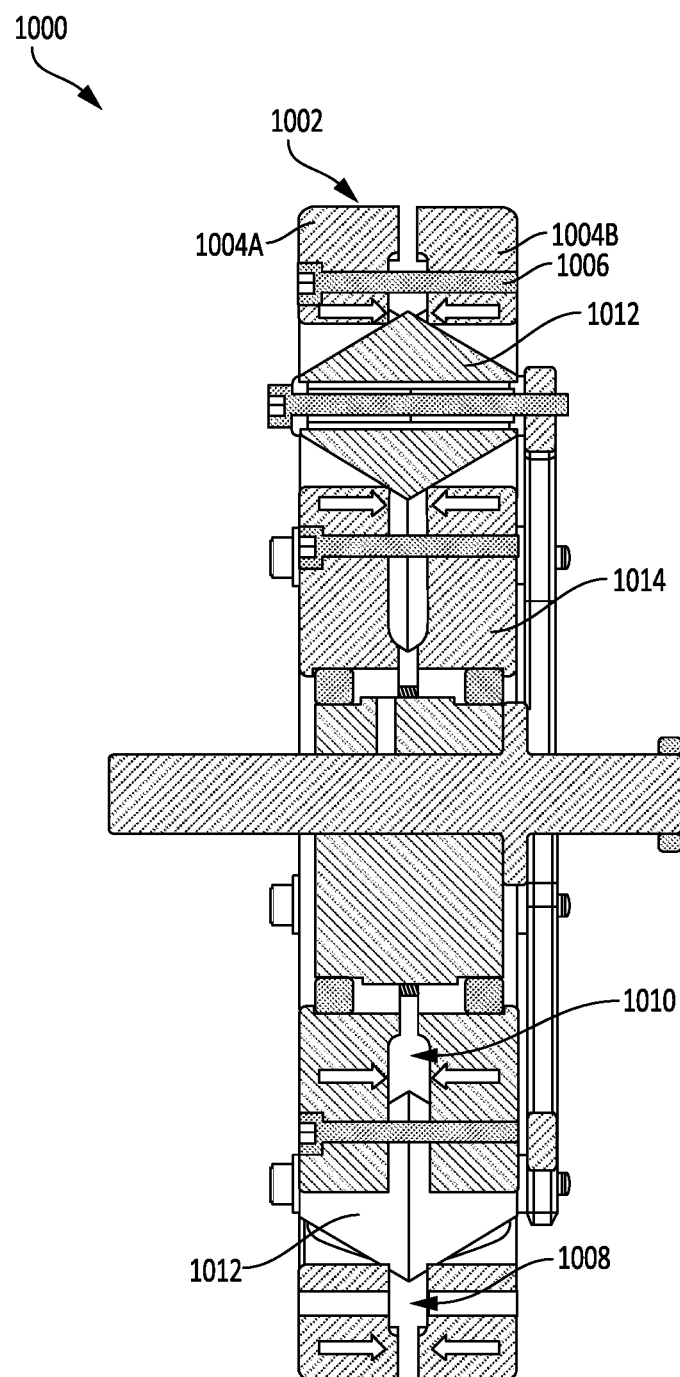
FIG. 10 illustrates an example cycloid drive configured to reduce backlash, in accordance with an example implementation.

FIG. 10 illustrates an example cycloid drive 1000 configured to reduce backlash, in accordance with an example implementation. A first (outer) ring 1002 of the cycloid drive 1000 may be split into two halves 1004A and 1004B. The two halves 1004A-1004B could be coupled together by stiff springs or screws such as screw 1006. By tightening the screw(s) 1006, a width of grooves (channels or cutouts) 1008 and 1010 may be reduced, thus causing interference between the grooves 1008, 1010 and roller(s) 1012. The tighter the screw(s), the more reduction in backlash is achieved. However, efficiency is reduced because friction increases between the roller(s) 1012 and the grooves 1008 and 1010.

The cycloid drive 1000 could also be used as an integrated overriding clutch. When the input torque exceeds a threshold, the output slips relative to the input. To use the cycloid drive 1000 as an integrated overriding clutch, the screws 1006 connecting the two halves 1004A-1004B could be replaced with stiff springs that can displace significantly. When the input torque exceeds a threshold value, the two halves 1004A and 1004B may move apart from each other, allowing the roller(s) 1012 to pass through a groove (e.g., the grooves 1008 and 1010) that would otherwise be too small for the roller(s) 1012 to pass therethrough. As the roller(s) 1012 traverse a groove, they may be caught in the next section of the groove, unless the input torque still exceeds the threshold value. An advantage of this clutch is that it could be integrated directly in to the transmission with few added parts.

The cycloid drive 1000 could be configured by splitting the outer ring 1002 as shown in FIG. 10, inner ring 1014, or both.

IX. Compensating for Eccentricity

As mentioned above, the second (internal) ring (e.g., any of the second rings 208, 400, 500, 600, and 806) of cycloid drives are mounted eccentrically to an input shaft via a bearing or drive member. An output shaft of the cycloid drive is coupled to the second ring of the cycloid drive, and therefore the output shaft has eccentric motion and displaces in a perpendicular direction to the rotational axis of the second ring. In order to transmit a concentric angular rotation, the displacement can be removed.

Figure 11:
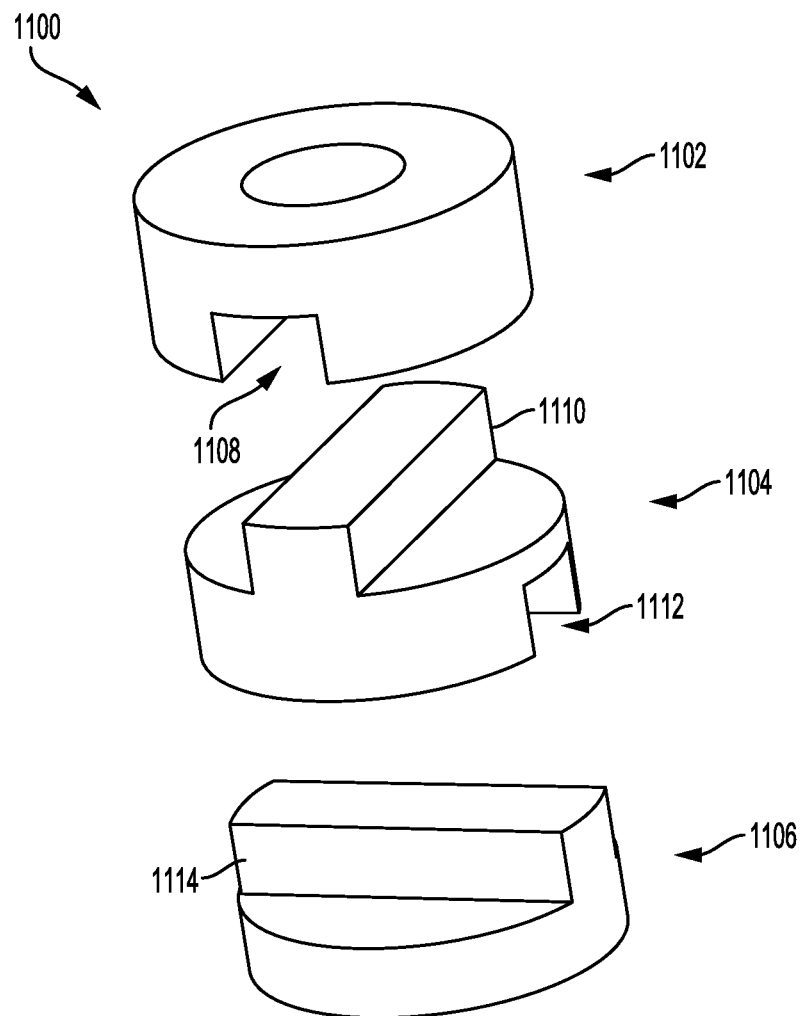
FIG. 11 illustrates a coupling used to connect two shafts that are not aligned coaxially, in accordance with an example implementation.

FIG. 11 illustrates a coupling 1100 used to connect two shafts that are not aligned coaxially, in accordance with an example embodiment. The coupling 1100 includes three disks 1102, 1104, and 1106. One of the outer disks such as the disk 1102 may be coupled to an input shaft while the other outer disk 1106 may be coupled to an output shaft.

The middle disk 1104 is coupled to both outer disks by tongue (i.e., key) and groove (i.e., keyway) configurations as shown. The terms "tongue" and "key" are used interchangeably herein. Similarly, the terms "groove" and "keyway" are used interchangeably herein.

Specifically, the outer disk 1102 has a groove 1108 and the middle disk 1104 has a tongue 1110 on a side facing the outer disk 1102 and thus corresponds to and engages with the groove 1108. Similarly, the middle disk 1104 has a groove 1112 on a side that faces the outer disk 1106, and the outer disk 1106 has a tongue 1114 that corresponds to and engages with the groove 1112. The tongue 1110 is perpendicular to the groove 1112. Accordingly, the middle disk 1104 is configured to slide radially with respect to the outer disks 1102 and 1106 as the disks 1102, 1104, and 1106 rotate.

The unaligned input and output shafts are coupled to the outer disks 1102 and 1106 and the middle disk 1104 transfers rotation of the input shaft to the output shaft. Because the middle disk 1104 is configured to slide radially with respect to the outer disks 1102 and 1106, the effect of the misalignment between the input and output shafts is eliminated.

The coupling 1100 could be used to eliminate the eccentricity of the cycloid drives described above. As an example, referring back to FIG. 2C, one of the outer disks 1102 and 1106 of the coupling 1100 may be coupled to the second ring 208. The output shaft may then be coupled to the other outer disk. Thus, as the second ring 208 rotates in an eccentric manner, the ability of the middle disk 1104 to slide radially with respect to the outer disks 1102 and 1106 compensates for the effect of the eccentricity at the output shaft.

Figure 12A:
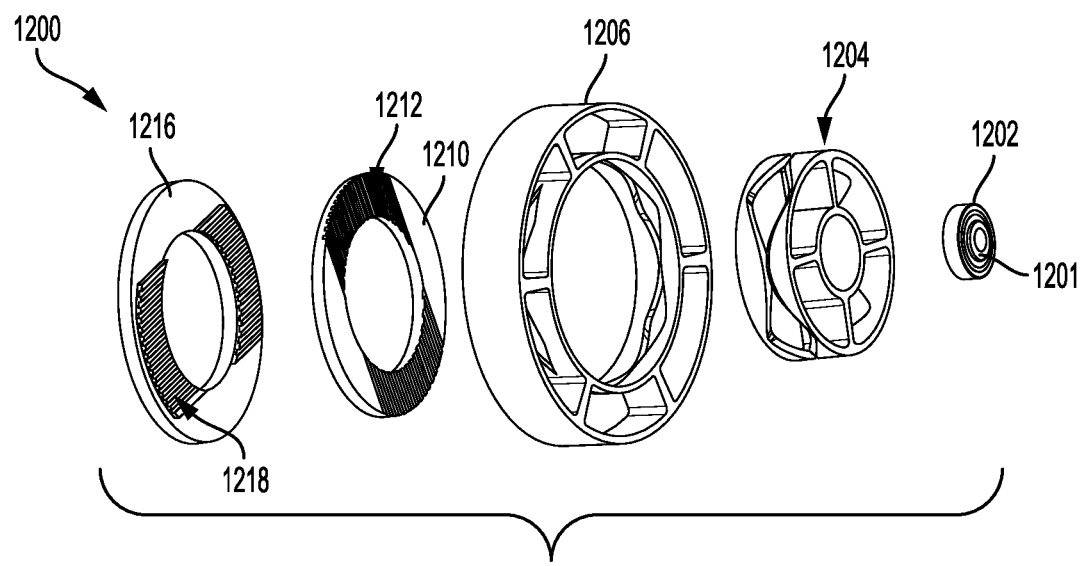
FIG. 12A illustrates an exploded view of a coupling configuration to compensate for eccentricity at an output of a cycloid drive, in accordance with an example implementation.
Figure 12B:
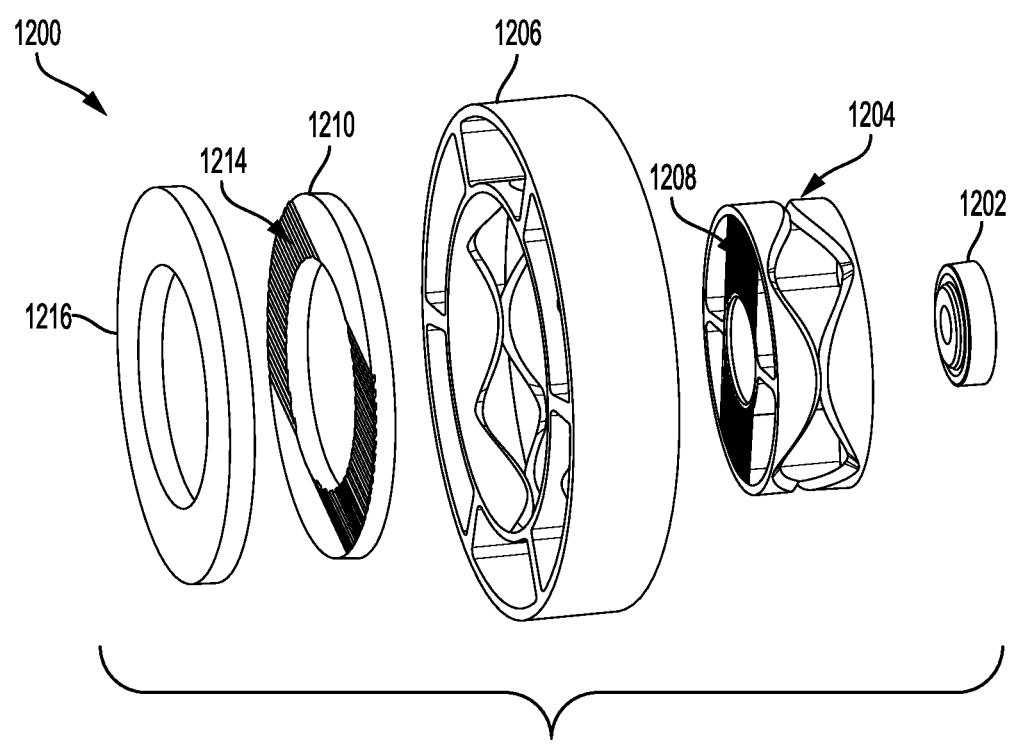
FIG. 12B illustrates an exploded view of the coupling configuration of FIG. 12A from another viewing angle, in accordance with an example implementation.

FIGS. 12A-12B illustrates a coupling configuration 1200 to compensate for eccentricity at an output of a cycloid drive, in accordance with an example implementation. The cycloid drive illustrated in FIGS. 12A-12B is similar to the cycloid drive apparatus 216 with its first ring and second ring. The rollers and roller cage are omitted to reduce visual clutter in FIGS. 12A-12B.

In the configuration 1200, in contrast to the relatively large tongue and groove arrangement illustrated in FIG. 11, the cycloid drive has an array of smaller tongues and grooves. By using multiple parallel smaller tongues and grooves, the load capacity of the coupling increases for a given volume, thus enabling the configuration 1200 to be more compact for a give load capacity.

FIG. 12A illustrates an exploded view of the cycloid drive with one viewing angle and FIG. 12B illustrates an exploded view from another viewing angle so that both sides of the components may be illustrated in the Figures. The input shaft may be coupled to component 1201 at a center of the component 1201 (i.e., the input shaft and the component 1201 are concentric). A bearing 1202 is eccentrically mounted to the input component 1201. The eccentrically mounted bearing 1202 is coupled to a second ring 1204 of the cycloid drive. The second ring 1204 could be disposed within a first ring 1206 (similar to the configuration of the second ring 208 and the first ring 200 in the apparatus 216).

Further, as shown in FIG. 12B, the second ring 1204 is configured to operate as one of the output disks 1102 and 1106. The second ring 1204 has a first side that faces toward the input shaft and a second side opposite to the first side. The second side includes multiple tongues and grooves 1208 as opposed to a single tongue (e.g., the tongue 1114) or a single groove (e.g., the groove 1108).

The configuration 1200 includes an intermediate disk 1210 that is equivalent to the middle disk 1104 in FIG. 11. Instead of the single tongue 1110 and the single groove 1112 of the disk 1104, the disk 1210 has multiple tongues and grooves 1212 and 1214 on both sides of the disk. Particularly, a first side of the disk 1210 faces toward the second ring 1204 and has the tongues and grooves 1212, whereas a second side opposite to the first side has the tongues and grooves 1214. The tongues and grooves 1212 are perpendicular to tongues and grooves 1214.

Disk 1216 is an output disk similar to either of the outer disks 1102 and 1106. The disk 1216 has multiple tongues or grooves 1218 configured to engage with the tongues or grooves 1214 of the disk 1210. In operation, as the second ring 1204 moves in an eccentric manner, the disk 1210 slides radially with respect to both the second ring 1204 and the output disk 1216, and thus the eccentricity of the output is eliminated.

Figure 13A:
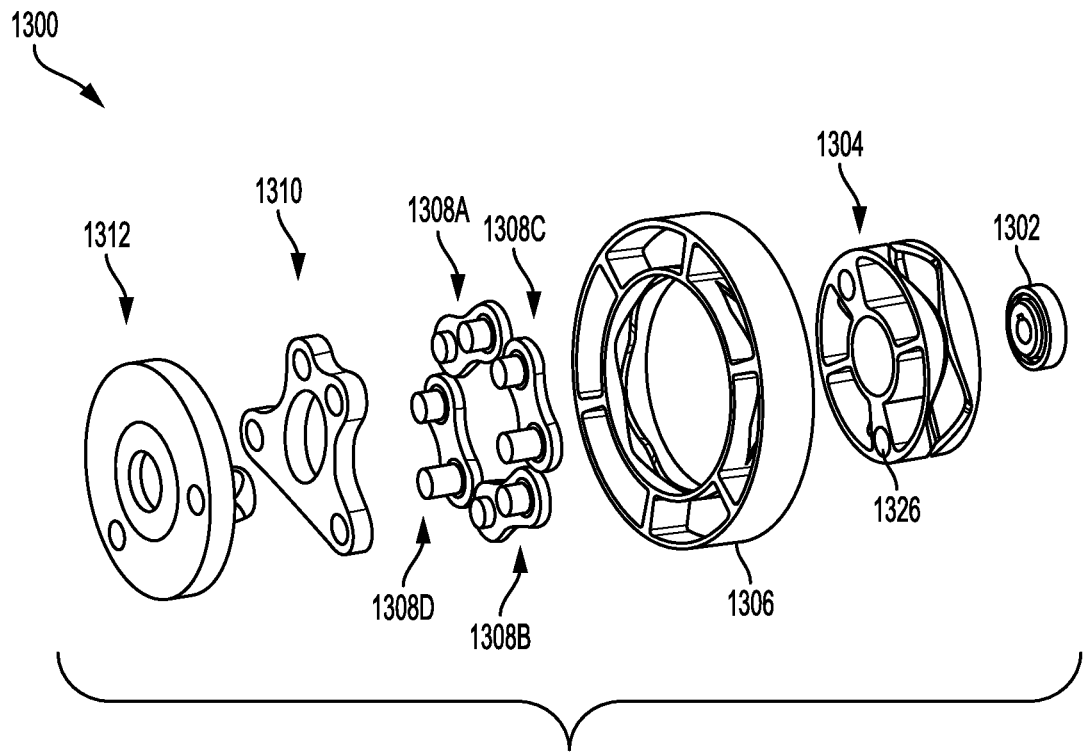
FIG. 13A illustrates an exploded view of a configuration to compensate for eccentricity at an output of a cycloid drive, in accordance with an example implementation.
Figure 13B:
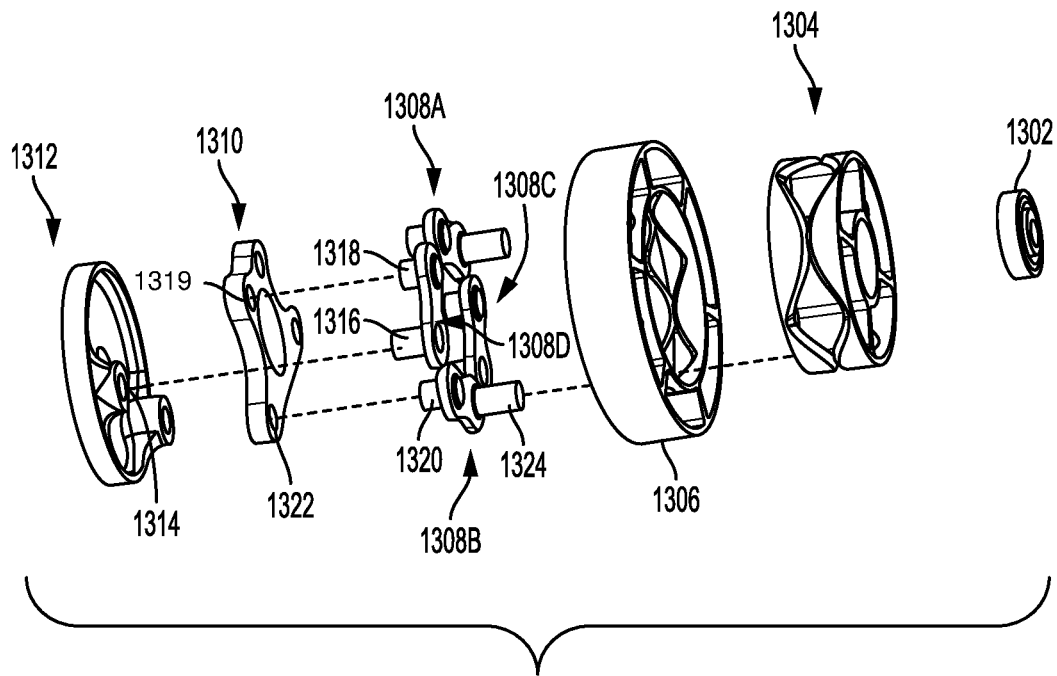
FIG. 13B illustrates an exploded view of the configuration of FIG. 13A from another viewing angle, in accordance with an example implementation.

FIGS. 13A-13B illustrate an exploded view of another configuration 1300 to compensate for eccentricity at an output of a cycloid drive, in accordance with an example implementation. The configuration 1300 uses links to compensate for the eccentricity.

An input shaft may be coupled to an eccentrically mounted bearing 1302. The bearing 1302 is eccentric with respect to the input shaft as described in previous configurations. The configuration 1300 includes a second (internal) ring 1304 rotatable within a first ring 1306. The second ring 1304 has a first side facing toward the input shaft and a second side opposite the first side.

The configuration 1300 includes four links 1308A, 1308B, 1308C, and 1308D, each link having two pegs. More or fewer links could be used, and each link could have more or fewer pegs. The links 1308A, 1308B, 1308C, and 1308D are connected or coupled to each other and are disposed in a plane parallel to a respective plane of the second ring 1304. The pegs of the links 1308A, 1308B, 1308C, and 1308D protrude in a direction perpendicular to the plane.

The configuration 1300 also has an intermediate member 1310 having four holes as shown. The configuration 1300 also has an output member 1312 that has two holes, such as hole 1314. A subset the pegs of the links 1308A, 1308B, 1308C, and 1308D face toward and are coupled to the intermediate member 1310 and the output member 1312, whereas another subset of pegs face toward and are coupled to the second ring 1304.

The dashed lines in FIG. 13B illustrate how half of the pegs of the links 1308A, 1308B, 1308C, and 1308D are coupled to holes in other members. For instance, a peg 1316 of the link 1308D extends beyond the intermediate member 1310 and is coupled to the hole 1314 of the output member 1312. A peg 1318 of the link 1308D is coupled to a hole 1319 of the intermediate member 1310. A peg 1320 of the link 1308B is coupled to a hole 1322 of the intermediate member 1310. A peg 1324 of the link 1308B is coupled to a hole 1326 of the second ring 1304. Only half the connections of the pegs with respective holes are shown to reduce visual clutter in the drawings.

Each peg is free to rotate within a corresponding hole the peg is received at or coupled thereto. As described in previous configurations, the second ring 1304 moves about in an eccentric manner. The lengths of the links 1308A, 1308B, 1308C, and 1308D should be substantially larger than the amount of eccentricity of the second ring 1304 so as to compensate for the eccentricity. The second ring 1304 causes, via the pegs coupled thereto, the links 1308A-D and the intermediate member 1310 to move in a manner that eliminates or reduces the eccentric motion. Thus, the output member 1312 also moves about without the eccentricity. A shaft coupled to the output member would therefore rotate without eccentric motion.

Figure 14:
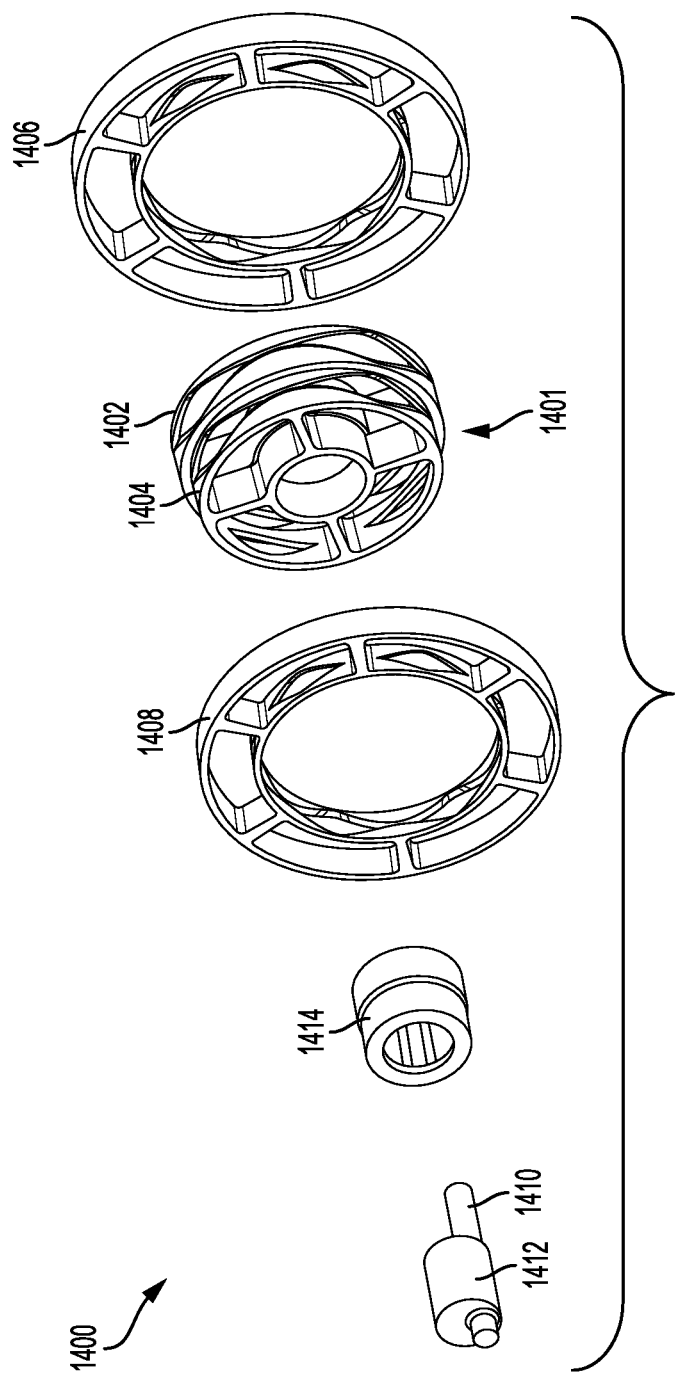
FIG. 14 illustrates another configuration to compensate for eccentricity of a cycloid drive, in accordance with an example implementation.

FIG. 14 illustrates another configuration 1400 to compensate for eccentricity of a cycloid drive, in accordance with an example implementation. While the configurations shown previously include a single second ring, the configuration 1400 includes a compound second ring 1401 having two second rings 1402 and 1404. The two second rings 1402 and 1404 are affixed to each other, and thus rotate as one unit at the same speed.

The configuration 1400 also include two corresponding first rings 1406 and 1408, such that the second ring 1402 rotates within the first ring 1406 and the second ring 1404 rotates within the first ring 1408. One of the first rings is grounded, i.e., fixed, while the other first ring is free to rotate, i.e., floating.

Pitch diameters of the two second rings 1402 and 1404 differ by a small or threshold amount. For example, the pitch diameter of the second ring 1402 could be 55 mm and the pitch diameter of the second ring 1404 could be 50 mm. Similarly, the pitch diameters of the two first rings 1406 and 1408 differ by a small or threshold amount, but the difference in pitch diameters of the first rings 1406 and 1408 is equal to the difference in the pitch diameters of the second rings 1402 and 1404. For example, the pitch diameter of the first ring 1406 could be 60 mm and the pitch diameter of the first ring 1408 could be 55 mm.

FIG. 14 also shows an input shaft 1410 coupled to an eccentric component 1412. The second rings 1402 and 1404 are mounted to a roller bearing 1414 configured to encompass the eccentric component 1412. In operation, as the input shaft 1410 rotates, the second rings 1402 and 1404 both move in an eccentric manner within their respective first rings 1406 and 1408, respectively.

If the first ring 1406 is considered as the "ground" ring (i.e., the first ring that does not move), then the output may be harvested from the first ring 1408, which is free to rotate or is floating. The arrangement of the second ring 1404 and the first ring 1408 cancels the eccentricity of the rotation of the second ring 1402 within the first ring 1406. Thus, the output has no eccentricity. In this configuration, a large reduction ratio may be obtained as the reduction ratio of the configuration 1400 is the product of the two reduction ratios between each first ring and second ring pair.

X. Conclusion

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. An apparatus comprising:
a first ring having an open annular space and a series of variable-width cutouts disposed on an interior peripheral surface of the first ring;
a second ring rotatable within the open annular space of the first ring, wherein the second ring has a respective series of variable-width cutouts disposed on an exterior peripheral surface of the second ring; and
a plurality of rollers disposed between, and configured to roll on, the interior peripheral surface of the first ring and the exterior peripheral surface of the second ring and rotatable therebetween, wherein:
the first ring has a total number of variable-width cutouts and the second ring has a total number of variable-width cutouts, with the total number of variable-width cutouts of the second ring being smaller than the total number of variable-width cutouts of the first ring, and a total number of the plurality of rollers being less than the total number of variable-width cutouts of the first ring and greater than the total number of variable-width cutouts of the second ring.

2. The apparatus of claim 1, wherein as a given roller of the plurality of rollers traverses a variable-width cutout of either the variable-width cutouts of the first ring or the variable-width cutouts of the second ring, a radial distance between a center of the first ring and the given roller varies.

3. The apparatus of claim 1, wherein at least one cutout of the variable-width cutouts starts with a first width at a first end of the cutout, increases to a second width larger than the first width at a center of the cutout, and narrows back to the first width at a second end of the cutout.

4. The apparatus of claim 1, further comprising:
a roller cage disposed between the first ring and the second ring and configured to couple the plurality of rollers to each other, wherein the roller cage is rotatable in the open annular space of the first ring as the plurality of rollers roll between the interior peripheral surface of the first ring and the exterior peripheral surface of the second ring.

5. The apparatus of claim 4, wherein the roller cage couples the plurality of rollers such that the rollers are equidistant from each other.

6. The apparatus of claim 1, wherein the plurality of rollers are spherical.

7. The apparatus of claim 1, wherein the plurality of rollers each have a rhombic cross section in a plane parallel to an axis of rotation of the second ring and a circular cross section in a plane perpendicular to the axis of rotation of the second ring.

8. The apparatus of claim 1, wherein the interior peripheral surface of the first ring has a variable-width groove disposed therein, wherein a width of the variable-width groove varies between a first width and a second width larger than the first width, wherein the variable-width cutouts comprise regions of the variable-width groove that increase from the first width to the second width and back to the first width, and wherein the variable-width cutouts are separated by portions of the variable-width groove having the first width.

9. The apparatus of claim 1, wherein the first ring is fixed.

10. An apparatus comprising:
a first ring having an open annular space and a plurality of depressions spatially arranged in series along an interior peripheral surface of the first ring, wherein a groove is disposed in the interior peripheral surface including the plurality of depressions;
a second ring rotatable within the open annular space of the first ring, wherein the second ring has a respective plurality of depressions spatially arranged in series along an exterior peripheral surface of the second ring, and wherein a respective groove is disposed in the exterior peripheral surface including the respective plurality of depressions; and
a plurality of rollers configured to engage, and roll within, the groove disposed in the interior peripheral surface and the respective groove disposed in the exterior peripheral surface as the second ring rotates within the open annular space of the first ring.

11. The apparatus of claim 10, wherein:
the first ring has a total number of depressions and the second ring has a total number of depressions, with the total number of depressions of the second ring being smaller than the total number of depressions of the first ring, and a total number of the plurality of rollers being less than the total number of depressions of the first ring and greater than the total number of depressions of the second ring.

12. The apparatus of claim 10, further comprising:
a roller cage disposed between the first ring and the second ring and configured to couple the plurality of rollers to each other, wherein the roller cage is rotatable in the open annular space as the plurality of rollers roll between the interior peripheral surface of the first ring and the exterior peripheral surface of the second ring.

13. The apparatus of claim 10, wherein either the first ring or the second ring is fixed.

14. The apparatus of claim 10, wherein as a given roller of the plurality of rollers traverses the groove and the plurality of depressions of the first ring and the respective groove and the respective plurality of depressions of the second ring, a radial distance between a center of the first ring and the given roller varies.

15. An apparatus comprising:
a first ring having an open annular space and a variable-width groove disposed on an interior peripheral surface of the first ring, wherein the variable-width groove of the first ring defines a plurality of regions, such that at least one region of the plurality of regions starts with a first width at a first end of the region, increases to a second width larger than the first width at a center of the region, and narrows back to the first width at a second end of the region;
a second ring rotatable within the open annular space of the first ring, wherein the second ring has a respective variable-width groove disposed on an exterior peripheral surface of the second ring, wherein the respective variable-width groove of the second ring defines a respective plurality of regions, such that at least one respective region of the respective plurality of regions starts with the first width at a respective first end of the respective region, increases to the second width at a respective center of the respective region, and narrows back to the first width at a respective second end of the respective region; and
a plurality of rollers disposed between, and configured to roll on, the interior peripheral surface of the first ring and the exterior peripheral surface of the second ring and rotatable therebetween while engaging the variable-width groove of the first ring and the respective variable width groove of the second ring, wherein a total number of regions defined by the variable-width groove of the second ring is smaller than a total number of regions defined by the respective variable-width groove of the first ring and a total number of the plurality of rollers is less than the total number of regions defined by the variable-width groove of the first ring and greater than the total number of regions defined by the respective variable-width groove of the second ring.

16. The apparatus of claim 15, wherein as a given roller of the plurality of rollers traverses the variable-width groove of the first ring and the respective variable-width groove of the second ring, a radial distance between a center of the second ring and the given roller varies.

17. The apparatus of claim 15, wherein the variable-width groove is a first variable-width groove, wherein the respective variable-width groove is a first respective variable-width groove, wherein the first ring has a second variable-width groove disposed parallel to the first variable-width groove, and wherein the second ring has a second respective variable-width grove disposed parallel to the first respective variable-width groove.

18. The apparatus of claim 17, wherein at least one roller of the plurality of rollers comprises two of side-by-side rollers coupled to each other and configured to traverse the first and second variable-width grooves of the first ring and the first and second respective variable-width grooves of the second ring.

* * * * *